(12) United States Patent
    Singh

(10) Patent No.: US 10,796,042 B1
(45) Date of Patent: Oct. 6, 2020

(54) PARTIAL SELECTION-BASED MODEL EXTRACTION FROM CIRCUIT DESIGN LAYOUT

(71) Applicant: Cadence Design Systems, Inc., San Jose, CA (US)

(72) Inventor: Balvinder Singh, Faridabad (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/391,122

(22) Filed: Apr. 22, 2019

(51) Int. Cl.
    *G06F 30/30* (2020.01)
    *G06F 30/392* (2020.01)

(52) U.S. Cl.
    CPC ............ *G06F 30/30* (2020.01); *G06F 30/392* (2020.01)

(58) Field of Classification Search
    CPC .............. G06F 2111/04; G06F 2111/12; G06F 2115/08; G06F 30/3323; G06F 30/367; G06F 30/39; G06F 30/30; G06F 30/392; G06F 30/394; G06F 30/398; H03K 19/00
    See application file for complete search history.

(56) References Cited

U.S. PATENT DOCUMENTS 10,558,780 B1    2/2020  Kukal et al.
2017/0249400 A1*  8/2017  Oriordan ............... G06F 30/392

* cited by examiner

*Primary Examiner* — Vuthe Siek
(74) *Attorney, Agent, or Firm* — Schwegman Lundberg & Woessner, P.A.

(57) ABSTRACT

Various embodiments provide for partial selection-based (e.g., cut-based) model extraction from a layout of a circuit design, which can be used to generate a schematic extracted view for the circuit design and to back annotate a schematic of the circuit design. For some embodiments, the selection comprises a cut of a layout of a circuit design, where the cut may be defined (e.g., inputted) by a user through a graphical user interface that is presenting the layout.

20 Claims, 20 Drawing Sheets

200

202 SELECTION OF PORTION OF LAYOUT OF CIRCUIT DESIGN

204 GENERATE PLUARLITY OF NETWORK FRAGMENTS BASED ON BOUNDARY OF SELECTION

206 GENERATE NETWORK FRAGMENT MAPPING DATA BASED PLURALITY OF NETWORKS FRAGMENTS

208 GENERATE MODEL(S) BASED ON NETWORK FRAGMENTS

210 GENERATE SCHEMATIC EXTRACTED VIEW OF CIRCUIT DESIGN BASED ON MODEL AND NETWORK FRAGMENT MAPPING DATA

212 ANNOTATE SCHEMATIC OF CIRCUIT DESIGN BASED ON SCHEMATIC EXTRACTED VIEW AND NETWORK FRAGMENT MAPPING DATA

PARTIAL SELECTION-BASED MODEL EXTRACTION FROM CIRCUIT DESIGN LAYOUT

TECHNICAL FIELD

Embodiments described herein relate to circuit design and, more particularly, to systems, methods, devices, and instructions for partial selection-based (e.g., cut-based) model extraction from a circuit design layout, which can be used as part of electronic design automation (EDA).

BACKGROUND

Modern electronic design is typically performed with computer-aided design (CAD) tools or electronic design automation (EDA) systems. To design an integrated circuit (IC) device, a designer first creates high-level behavior descriptions of the IC device using a high-level hardware design language (HDL). Common examples of HDLs include Verilog and VHDL. An EDA system typically receives the high-level behavioral descriptions of the IC device and translates this high-level design language into netlists of various levels of abstraction. Essentially, the process to implement an electronic device begins with functional design and verification (e.g., using RTL), and then proceeds to physical design of a circuit design layout and verification.

Circuit designers and verification engineers use different methods to verify circuit designs. One common method of verification is through simulation of the circuit design of interest. Simulation dynamically verifies a design by monitoring behaviors of the design with respect to test stimuli. For many types of designs, simulation can and should be performed during the design process to ensure that the ultimate goals are achievable and will be realized by the finished product.

SPICE (Simulation Program with Integrated Circuit Emphasis) is a common type of simulator that is used to simulate and verify the operation of an electronic design. With SPICE, the electronic design is converted into a system of equation(s), which is then solved for a given set of inputs to check the state of specific portions of the circuit at given points in time. Furthermore, capturing the electrical behaviors of a circuit design requires correctly modeling various components of a circuit design to include, for example, geometric information, parasitic information, etc. Although many vendors provide, for example, SPICE models, scattering parameter [s-parameter] models, and the like for their devices, an IC design or a system design may involve much more than merely these device models for simulation. For example, the packaging may need to be properly accommodated in such models, the traces or interconnects may need to be modeled to reflect more realistic voltage drops, and the like. For many circuit designs, this process can be a very computationally expensive and time-consuming effort, especially given the size and complexity of modern circuit designs.

Conventional approaches for simulations, especially for board- or system-level simulations (e.g., simulations performed on an electronic system including the printed circuit board or PCB, one or more integrated circuit (IC) chips, and IC packaging thereof) often extract a static simulation view from circuit design layouts (e.g., IC layout, package layout, board layout, etc.) by identifying a corresponding schematic symbol from the schematic symbol library for each of a plurality of circuit design layouts for circuit devices, invoking the corresponding layout editor, and performing the extraction therein. The extraction results are then saved as some textual form (e.g., an ASCII file for a SPICE netlist). As a result, these simulation views are often termed "circuit design schematic extracted views" or simply "schematic extracted views." By binding and annotating a circuit design with a schematic-driven schematic extracted view, the schematic extracted views can be illustrated with respect to a graphical representation or a simplified version thereof representing how circuit components of a circuit design are connected.

In particular, binding and annotating a circuit design with a schematic-driven extracted view can cause a circuit design schematic (also referred to herein simply as a schematic), a circuit design layout (also referred to herein simply as a layout), or both to be annotated with various types of information to facilitate various circuit design (e.g., EDA) tasks, such as probing, testing, modification, fine-tuning, optimization, or the like. In doing so, binding and annotating a circuit design can enable preparation of an underlying circuit design or finalization of the circuit design for mask preparation and mask writing as well as for tapeout for the eventual manufacturing of the circuits represented by the circuit design. The schematic-driven extracted view can include one or more models (e.g., s-parameter or sparam models) representing one or more corresponding schematic circuit component designs, and a binding between at least two of a schematic of the circuit design, a corresponding layout, an extracted view, the one or more models in the extracted view, the one or more schematics for circuit design components, or one or more layouts for circuit design components.

BRIEF DESCRIPTION OF THE DRAWINGS

Various ones of the appended drawings merely illustrate various embodiments of the present disclosure and should not be considered as limiting its scope.

FIGS. 2 and 3 are flowcharts illustrating example methods for partial selection-based model extraction from a circuit design layout, according to some embodiments.

DETAILED DESCRIPTION

Figure 1:
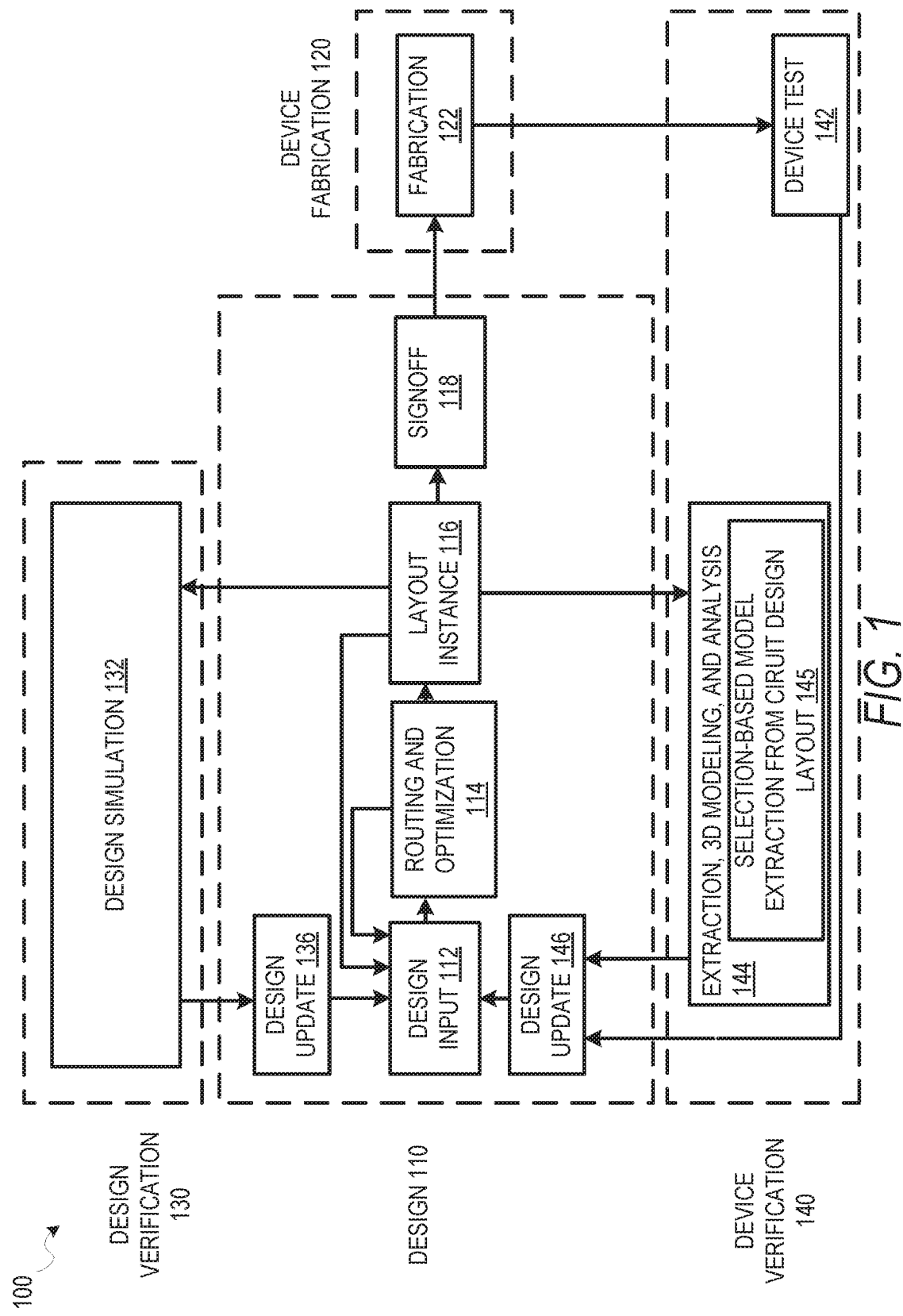
FIG. 1 is a diagram illustrating an example design process flow for partial selection-based model extraction from a circuit design layout, according to some embodiments.

Various embodiments provide for extracting a model (e.g., s-parameter model) from a layout of a circuit design based on a selection (e.g., selection defined by a cut drawn over the layout), which can be used as part of electronic design automation (EDA). In particular, various embodiments described herein provide for partial selection-based model extraction from a circuit design layout by extracting a model (e.g., s-parameter model) of a portion of a network of a circuit design (e.g., partial network), where a user can select the portion by making a cut around the network (e.g., cut applied to a graphical representation of the network, such as one included by a layout of the circuit design). Various embodiments described herein can generate a schematic extracted view of a circuit design based on the partial selection-based extracted model. Additionally, various embodiments described herein can generate one or more back annotations (e.g., comprising graphical aids) for a schematic of a circuit design based on the schematic extracted view generated. Based on a cut of a layout of a circuit design, a model (e.g., s-parameter model) extracted based on the cut, and a schematic extracted view generated based on the extracted model, the back annotation generated can annotate a portion of a schematic of the circuit design that corresponds to a portion of layout selected by the cut.

For some embodiments, partial selection-based model extraction is based on a cut, which partitions (e.g., divides) a network of a circuit design at each point (e.g., cut point) that the boundary of the cut crosses over the network. Each cut can partition a given network at one or more cut points, and each cut can involve two or more networks of a circuit design. Some embodiments partition (e.g., fragment) one or more networks of a circuit design based on cut points to generate a plurality of network (net) fragments. Various embodiments generate network fragment mapping data comprising information (e.g., network fragment information) regarding the plurality of network fragments. For instance, the information can describe one or more mappings for coupling the plurality of network fragments together. Some embodiments can use information from the network fragment mapping data to determine voltage equivalences of different network fragments.

Depending on the embodiment, the network fragment mapping data can be implemented as a network fragment mapping file. For some embodiments, an extracted model is generated based on the network fragment mapping data, and data for the extracted model can describe one or more ports (of the extracted model) generated based on (e.g., information from) the network fragment mapping data.

Various embodiments described herein use the extracted model and the network fragment mapping data to generate a schematic extracted view for a circuit design. Subsequently, for some embodiments, the schematic extracted view and the network fragment mapping data are used to generate back annotation that can be applied to a schematic of the circuit design. Depending on the embodiment, selection/cut information can be included in data for the extracted model (e.g., in the model header of the extracted model), and selection/cut information can be included in network fragment mapping data (e.g., network fragment mapping file). For instance, an s-parameter model can be generated based on a plurality of network fragments created by one or more selections/cuts, and header data for the s-parameter model can comprise information regarding the plurality of network fragments.

Furthermore, various embodiments described herein provide a virtual cross-fabric layout hierarchy that can bridge the gap between a circuit design layout with a circuit package schematic. In doing so, some such embodiments enable partial selection-based model extraction and schematic extracted view generation with respect to cross-fabric cuts, which in turn can enable back annotation with respect to those cross-fabric cuts.

Unlike conventional methodologies for extracting models from circuit design layouts, various embodiments described herein can handle partial selection-based (e.g., cut-based) model extraction from a circuit design layout. By providing partial selection-based model extraction from a circuit design layout, some embodiments can be used to accurately model distortions for circuit designs involving high-speed data communications and or radio frequency (RF) components, such as high-frequency RF designs at integrated circuit (IC), circuit package, or printed circuit board (PCB) level. For instance, some embodiments can facilitate accurate modeling of distortions caused by one or more traces running parallel to a RF component of a circuit design. Additionally, some embodiments can be used to verify high-frequency circuit designs by facilitating extraction of s-parameters for one or more portions of a circuit design (e.g., according to one or more cuts), and generating s-parameter models corresponding to those one or more portions based on the extracted s-parameters.

As used herein, a circuit design layout (also referred to a layout) can comprise graphical content that depicts a physical representation of a circuit design. A circuit design schematic (also referred to as a schematic) can comprise graphical content that depicts a logical representation of a circuit design. Within a schematic, a symbol can comprise a graphical representation of a logical interface of a circuit design, which can be used to instantiate the circuit design at a higher circuit design level.

As used herein, a golden schematic can comprise an initial circuit design schematic to drive a layout of a circuit design. A schematic extracted view (of a circuit design) can describe connectivity of components of the circuit design with parasitics of layout traces or passive circuit devices; the schematic extracted view can be used to perform a simulation of the circuit design. A schematic-extracted view can comprise a schematic extracted view generated based on a graphical representation of a schematic (e.g., golden schematic) of a circuit design with embedded layout models.

As used herein, a cut can comprise a portion (e.g., area or region) of a layout of a circuit design that is selected (e.g., by a user, such as through a GUI of an EDA) for model extraction, where the one or more extracted models can be used to generate a schematic extracted view associated with the cut. A given cut can be defined or drawn (e.g., by a user) over a graphical presentation of a layout of a circuit design. Depending on the embodiment, a cut can comprise any polygon shaped partition of the layout of a circuit design. A network (net) fragment can comprise a portion of a network (net) of a circuit design which lies within the cut (e.g., network fragments 1:net1 and 2:net1 generated based on a cut of a network net1 of a circuit design). A port can comprise a point of intersection (e.g., coupling) between a cut and a layout net shape underlying the cut. For some embodiments, a port is auto-generated at each cut point that overlaps with a network of a circuit design, where each port can serve as an interface to a network fragment within the cut. For some embodiments, the port comprises a model port for an extracted model (e.g., s-parameter model) generated based on one or more network fragments within the cut (e.g., cut-based extracted model).

As used herein, an extracted model can comprise one or more of an electromagnetic (EM) field solver, a heuristic solver, or an empirical formula solver to solve for an electrical behavior of an underlying circuit design. Though various embodiments are described herein with respect to an s-parameter model, for some embodiments, a model can comprise other types of models, such as an Input/output Buffer Information Specification (IBIS) model or a SPICE model.

As used herein, a back annotation can comprise a visual or graphical aid that is generated based on information from a schematic extracted view (e.g., information from a s-parameter model) and that can be applied to a schematic (e.g., golden schematic) of a circuit design as an annotation. An example graphical annotation can include, without limitation, one or more labels, and highlighting one or more portions of a schematic of a circuit design, which can include one or more nets and passive devices associated with a model (e.g., s-parameter model) extracted based on a cut of a layout of the circuit design.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for partial selection-based model extraction from a circuit design layout, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. Though not shown, the routing and optimization 114 operation can include a clock tree synthesis (CTS) operation, which can generate one or more clock trees that deliver clock signal from clock sources of a circuit design to a plurality of clock tree leaf nodes comprising clock tree pins (e.g., of circuit devices, such as flip-flops) within the circuit design. The routing and optimization 114 operation may also include other operations not shown, such as those relating to floorplanning, placement, post-placement optimization, and post-routing optimization.

While the design process flow 100 shows optimization occurring prior to a layout instance 116, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

Design inputs are used in the design input 112 operation to generate an initial circuit layout. The design inputs may be further processed during the design input 112 operation via a process, such as logic-synthesis to generate a circuit netlist mapped to a target standard library manufacturable by the foundry in fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

As shown, the extraction, 3D modeling, and analysis 144 operation includes an operation 145 for partial selection-based model extraction from a circuit design layout, which may be performed in accordance with various embodiments described herein. For some embodiments, operation 145 can be performed prior as part of a three-dimensional (3D) electromagnetic (EM) modeling process performed on a circuit design, a high-frequency circuit design verification process performed on a circuit design, or a signal integrity test process performed on a circuit design.

Figure 3:
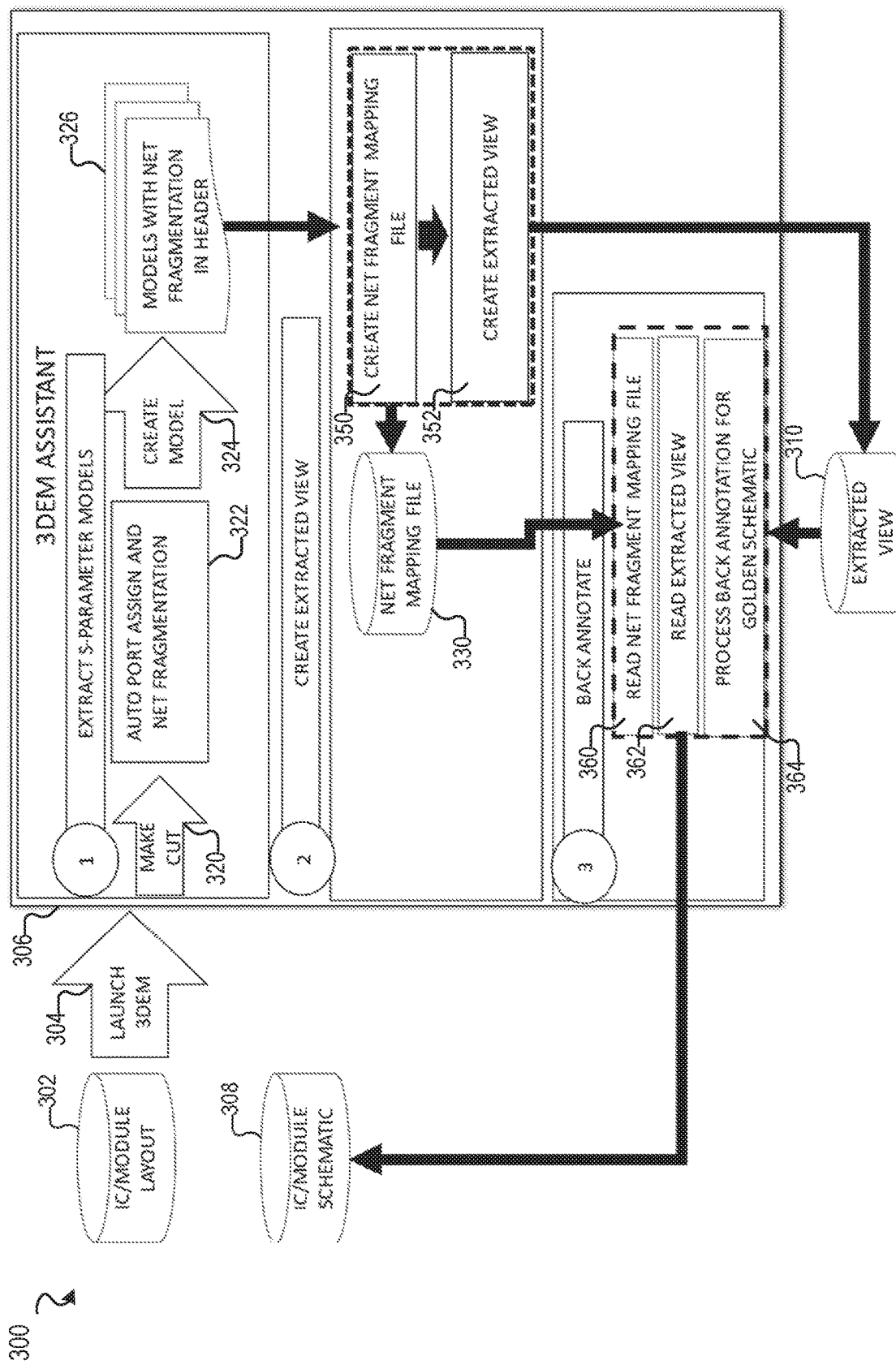

FIGS. 2 and 3 are flowcharts illustrating example methods for partial selection-based model extraction from a circuit design layout, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates the example method 200 for partial selection-based model extraction from a circuit design layout, according to some embodiments. The method 200 can be performed, for example, as part of a three-dimensional (3D) electromagnetic (EM) modeling feature performed on a circuit design, a high-frequency circuit design verification feature performed on a circuit design, or a signal integrity test feature performed on a circuit design (e.g., by an EDA software system). An operation of the method 200 (or another method described herein) may be performed by a hardware processor (e.g., central processing unit or graphics processing unit) of a computing device (e.g., desktop, server, etc.).

The method 200 as illustrated begins with operation 202 receiving (or generating) a selection of a portion of a layout of a circuit design. Depending on the embodiment, the selection can be one received from a user or can be one generated by a process or operation of a circuit design system (e.g., auto-selection by an EDA). For instance, the selection of the portion can be received from a user (e.g., circuit designer) by way of a user input with respect to a GUI (e.g., of an EDA) that is displaying a graphical representation of some or all of the circuit design (e.g., displaying at least the portion of the layout selected by the user), where the user input corresponds to the selection. For some embodiments, a boundary of the selection partitions (e.g., cuts) a network of the circuit design into a first set of portions of the network that falls within the selection region and a second set of portions of the network that falls outside the selection region. For instance, the selection can comprise a cut (e.g., as defined by the user) of the layout, whereby the area falling within the boundary of the cut can be regarded as the portion of the layout from which an extracted model will be generated as described herein. As described herein, a given cut can be defined or drawn (e.g., by a user) over a graphical presentation of the layout, and can comprise any polygon-shaped partition of the layout of a circuit design. With respect to the cut, each point where the boundary of the cut crosses over a given network can be considered a cut point, which partitions the given network into two separate portions (one inside the cut region and one outside the cut region) at the cut point. The boundary of a given cut can cross over a single given network at one or more cut points.

The method 200 continues with operation 204 generating a plurality of network fragments based on a boundary of the selection of operation 202. For some embodiments, operation 204 generates a first set of network fragments for (e.g., corresponding to) the first set of portions of the network and a second set of network fragments for (e.g., corresponding to) the second set of portions of the network based on the boundary of the selection. Where the first set of portions falls within the selection region (and the second set of portions falls outside the selection region), the first set of network fragments can be regarded as the network fragments from which an extracted model will be generated as described herein. For some embodiments, generating the first set of network fragments and the second set of network fragments comprises generating a set of ports assigned to the first set of network fragments, where the set of ports is configured to couple the first set of network fragments to the second set of network fragments.

The method 200 continues with operation 206 generating network fragment mapping data that describes a mapping for coupling the first set of network fragments generated at operation 204 with the second set of network fragments generated at operation 204. For some embodiments, the network fragment mapping data describes the mapping based on (e.g., in terms of) the set of ports generated and assigned to the first set of fragments by operation 204. By describing such mappings, the network fragment mapping data can provide the information that facilitates coupling (e.g., stitching) of different network fragments (e.g., generated based on cut points) during subsequent operations, such as generation of the schematic extracted view and back annotation of a schematic of the circuit design. For some embodiments, the network fragment mapping data comprises network fragment information that can be used to determine voltage equivalence of the different network fragments generated by operation 206. Depending on the embodiments, the network fragment mapping data can be implemented as a network fragment mapping file (NFMF) having a file format for storing network fragment information.

In some instances, the circuit design includes a circuit package that comprises a separate circuit design described by a circuit package schematic. The circuit package can be coupled to the remainder of the circuit design (e.g., IC layout), thereby forming a cross-fabric connection (e.g., location where a circuit design package and a IC are stitched together). For some embodiments, the first portion of the network comprises some part of the circuit design inside the circuit package and some part of the circuit design outside the circuit package. For some such embodiments, the network fragment mapping data can comprise a hierarchical name that maps a circuit design layout component to a circuit design schematic component, thereby mapping a layout name (associated with the circuit design layout component) to a schematic hierarchical name (associated with the circuit design schematic component). For example, the hierarchical name can comprise "Die0/I0/<IC schematic component>," where "Die0" represents a specific IC layout and "I0" represents an insertion point that serves as a bridge between the package fabric and remainder of the circuit design's fabric (e.g., the IC fabric). In using the insertion point, the path to the IC schematic component can include a real hierarchy on the schematic side. Additionally, the use of the insertion point can overcome the traditional challenge of schematics having one pin each for each signal net for an external connection, while a layout can comprise multiple pins for the same connected net.

The method 200 continues with operation 208 generating one or more models based on (e.g., corresponding to) the first set of network fragments. For some embodiments, a given model is generated by extracting behavior, properties, or parameters (e.g., s-parameters) for a network fragment (e.g., in the first set of network fragments) included by the portion of the layout of the circuit design selected by operation 202, and generating the given model based on the extracted information. The extracted information can include, without limitation, information regarding parasitics of traces on the layout of the circuit design. A given model subsequently generated based on the extracted information can comprise a complex model that includes coupling of networks and embedded components. An example of a model generated can include, without limitation, an s-parameter model generated based on scattering parameters (s-parameters) extracted with respect to network fragments that correspond to the selected portion of the layout. The s-parameter extraction can be performed from the layout view of the circuit design based on the physical geometry of the circuit design. For various embodiments, the data for the generated model (e.g., model header data) comprises information (e.g., port information) that enables correct stitching of the generated model into the layout of the circuit design. For instance, data for a given model can describe coupling of a given network fragment (in the first set of network fragments) corresponding to the given mode with a network fragment in the second set of network fragments based on one or more ports generated and assigned to the given network fragment (by operation 208).

The method 200 continues with operation 210 generating a schematic extracted view of the circuit design based on the set of models (generated at operation 208) and the network fragment mapping data (generated at operation 206). For some embodiments, the schematic extracted view is generated based on the set of models and the network fragment mapping data by replacing a portion of a schematic of the circuit design with instances of the set of models based on the network fragment mapping data. For instance, some embodiment can replace the portion of the circuit design, from which an s-parameter model is generated, with a corresponding s-parameter model instance. In doing so, some embodiments can merge (e.g., stitch) the generated set of models into the schematic (e.g., golden schematic) of the circuit design, which in turn can facilitate accurate analysis or simulation of the circuit design based on the resulting schematic, especially where the circuit design comprises a RF IC or RF module schematic. For some embodiments, the network fragment mapping data provides voltage equivalent information with respect to the first set of network fragments, which can be used in replacing the portion of the circuit design with the generated set of models.

The method 200 continues with operation 212 annotating (e.g., back annotating) a schematic of the circuit design based on the schematic extracted view (generated at operation 210) and the network fragment mapping data (generated at operation 206). For some embodiments, the annotating comprises generating a set of annotations configured to be applied to the schematic of the circuit design based on information provided by the schematic extracted view. An annotation can comprise a label or highlighting applied to one or more portions of the schematic, where each of those portions can comprise one or more networks and passive devices associated with (corresponding to) a given generated model. For some embodiments, the set of annotations generated includes a back annotation. As described herein, a back annotation can comprise a visual or graphical aid that is generated based on information from a schematic extracted view (e.g., information from an s-parameter model) and that can be applied to a schematic of a circuit design. The schematic that is annotated by operation 212 can comprise a golden schematic of the circuit design.

Referring now to FIG. 3, the flowchart illustrates the example method 300 for partial selection-based model extraction from a circuit design layout, according to some embodiments. In particular, the method 300 illustrates more specific implementation of various aspects of the method 200 described above with respect to FIG. 2. Like the method 200 of FIG. 2, the method 300 can be performed as part of a three-dimensional (3D) electromagnetic (EM) modeling process performed on a circuit design, a high-frequency circuit design verification process performed on a circuit design, or a signal integrity test process performed on a circuit design. An operation of the method 300 may be performed by a hardware processor.

The method 300 as illustrated begins with operation 304 launching a 3D EM (3DEM) modeling assistant feature 306 with respect to a layout 302 of a circuit design (e.g., IC or module). For some embodiments, the feature 306 is part of an EDA that is processing (e.g., accessing, generating, or modifying) the circuit design. As shown, the 3DEM modeling assistant feature comprises three stages: a first stage comprising extraction of one or more s-parameter models; a second stage comprising creation of a schematic extracted view; and a third stage comprising back annotation of a schematic of the circuit design.

The first stage begins, at operation 320, with a user (e.g., circuit designer) or a process (e.g., of the EDA) making a cut with respect to the layout 302 of the circuit design. The first stage continues with operation 322 generating a set of network fragments based on the cut and generating a set of ports assigned to the set of network fragments. Subsequently, at operation 324, one or more models 326 (e.g., s-parameter models) are generated based on the set of network fragments generated by operation 322. As described herein, data for the one or more models 326 (e.g., model header data) can include information regarding the set of network fragments generated by operation 322.

After the first stage, the second stage begins with operation 350 generating a network fragment mapping file 330 based on the set of network fragments generated by operation 322. The second stage continues with operation 352 generating a schematic extracted view 310 of the circuit design based on the one or more models 326 (generated by operation 322) and the network fragment mapping file 330 (generated by operation 350).

Following the second stage, the third stage begins with operation 360 reading the network fragment mapping file 330 generated by operation 350, and with operation 362 reading the schematic extracted view 310 generated by operation 352. Based on data read from the network fragment mapping file 330 and the schematic extracted view 310, operation 364 processes (e.g., generates) back annotation for application to a golden schematic of the circuit design. Subsequently, the back annotated schematic resulting from operation 364 can be saved as schematic 308.

Figure 4:
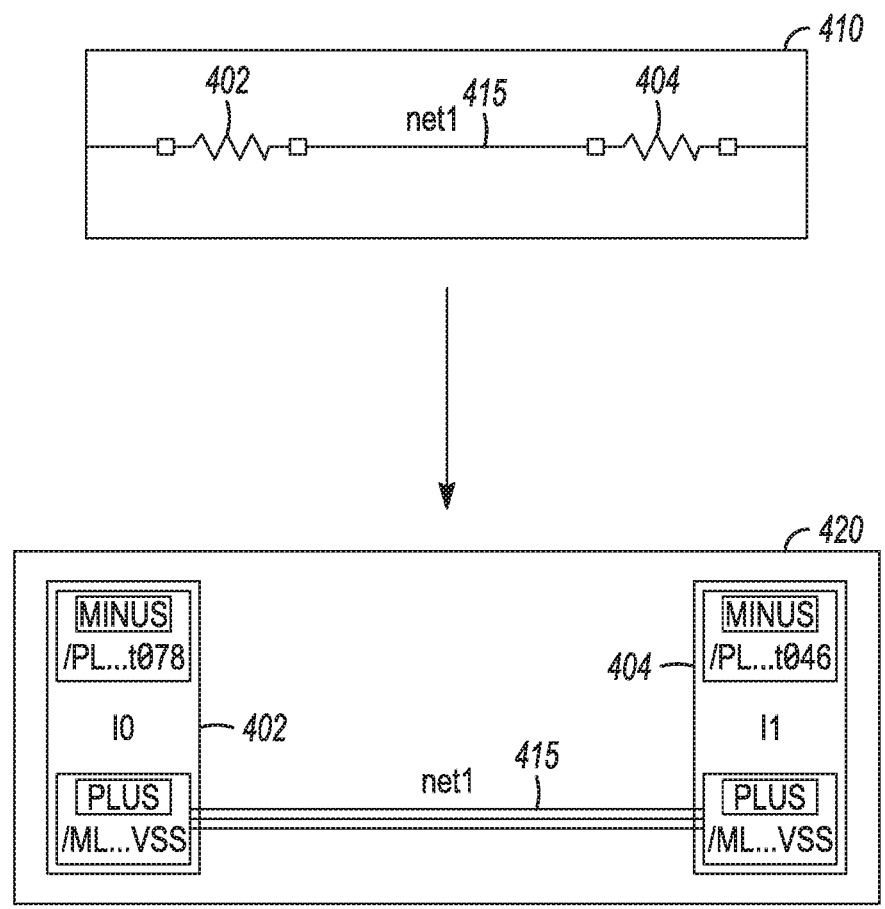
FIGS. 4 through 6 illustrate schematics and layouts of example circuit designs that can be processed or used by some embodiments.
Figure 5:
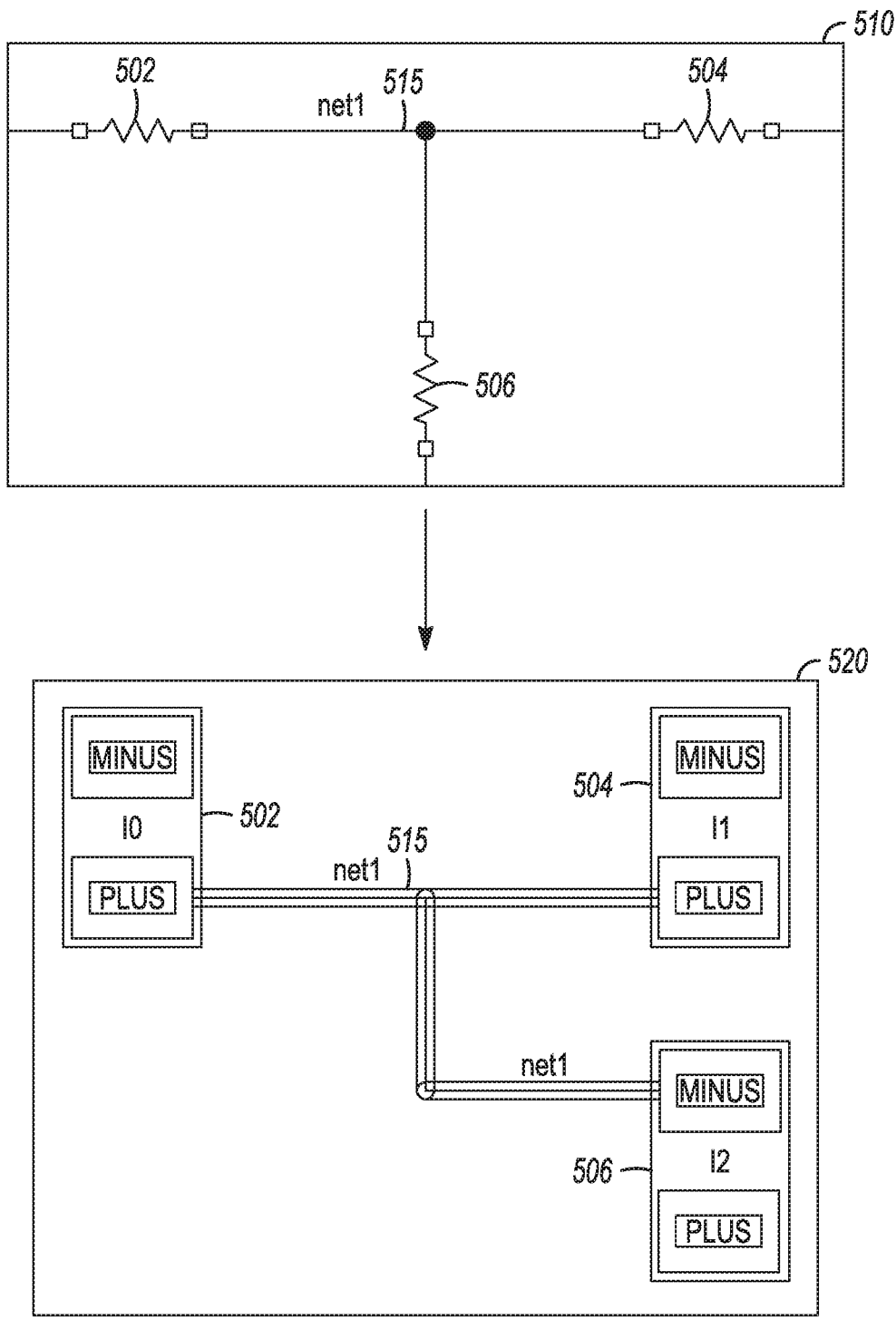
Figure 6:
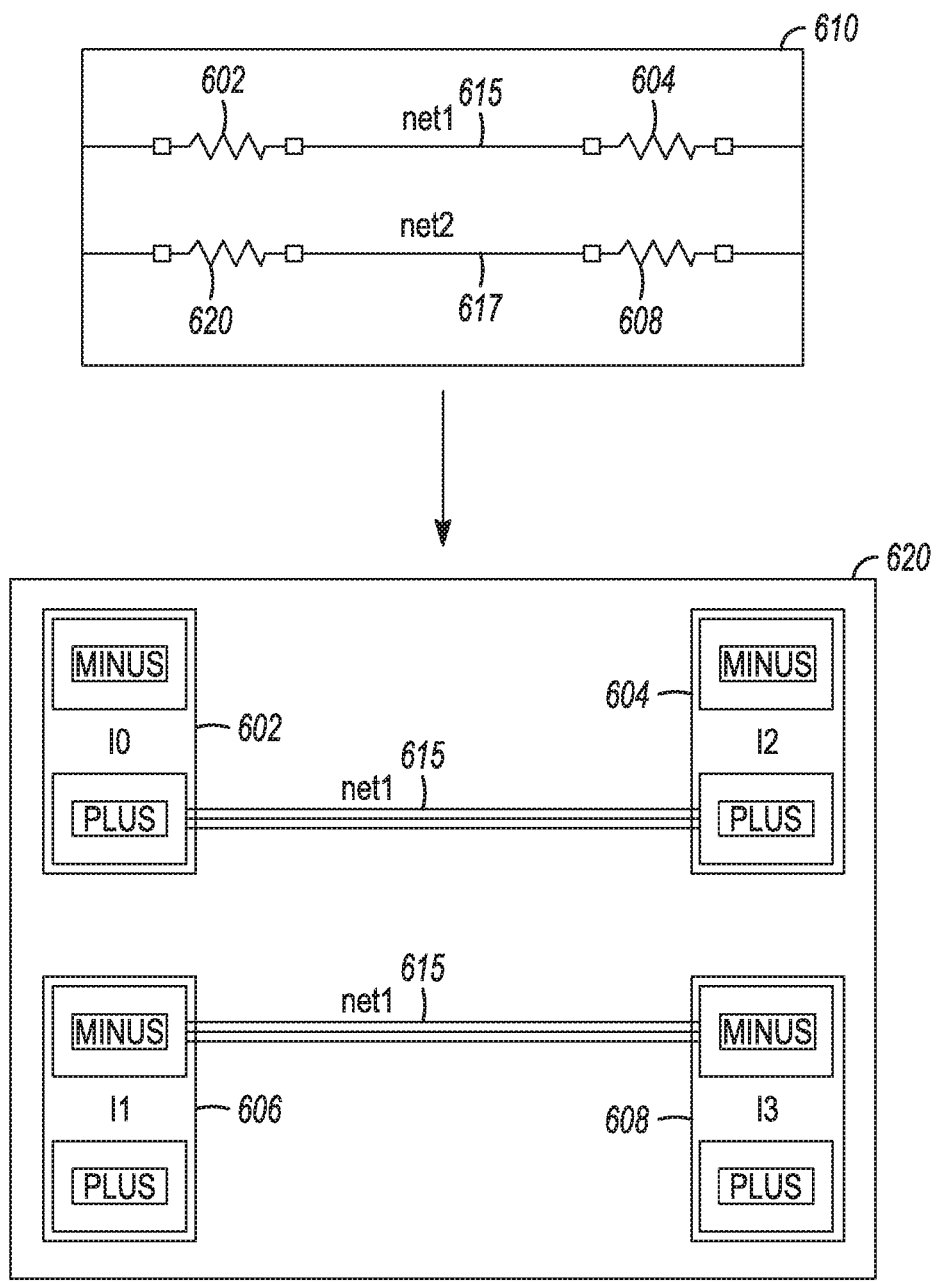

FIGS. 4 through 6 illustrate schematics and layouts of example circuit designs that can be processed by some embodiments. The circuit designs illustrated in FIGS. 4 through 6 represent single fabrics, which can form part of an IC, circuit package or a circuit board. As described herein, a layout can depict a physical representation of a circuit design, and a schematic can depict a logical representation of a circuit design. In particular, FIG. 4 illustrates a schematic 410 (e.g., golden schematic) of a circuit design, and a layout 420 of the same circuit design. As illustrated by the schematic 410 and the layout 420, the circuit design comprises a network net1 (415) that couples together two components 402, 404 of the circuit design. More regarding partial selection-based model extraction with respect to the schematic 410 and the layout 420 of FIG. 4 is discussed with respect to FIGS. 7, 8, 12, 14, and 15.

FIG. 5 illustrates a schematic 510 (e.g., golden schematic) of a circuit design, and a layout 520 of the same circuit design. As illustrated by the schematic 510 and the layout 520, the circuit design comprises a network net1 (515) that couples together three components 502, 504, 506 of the circuit design. More regarding partial selection-based model extraction with respect to the schematic 510 and the layout 520 of FIG. 5 is discussed with respect to FIGS. 9 through 11.

FIG. 6 illustrates a schematic 610 (e.g., golden schematic) of a circuit design, and a layout 620 of the same circuit design. As illustrated by the schematic 610 and the layout 620, the circuit design comprises a network net1 (615) that couples together two components 602, 604 of the circuit design, and a network net2 (617) that couples together two components 606, 608 of the circuit design. More regarding partial selection-based model extraction with respect to the schematic 610 and the layout 620 of FIG. 6 is discussed with respect to FIG. 13.

Figure 7:
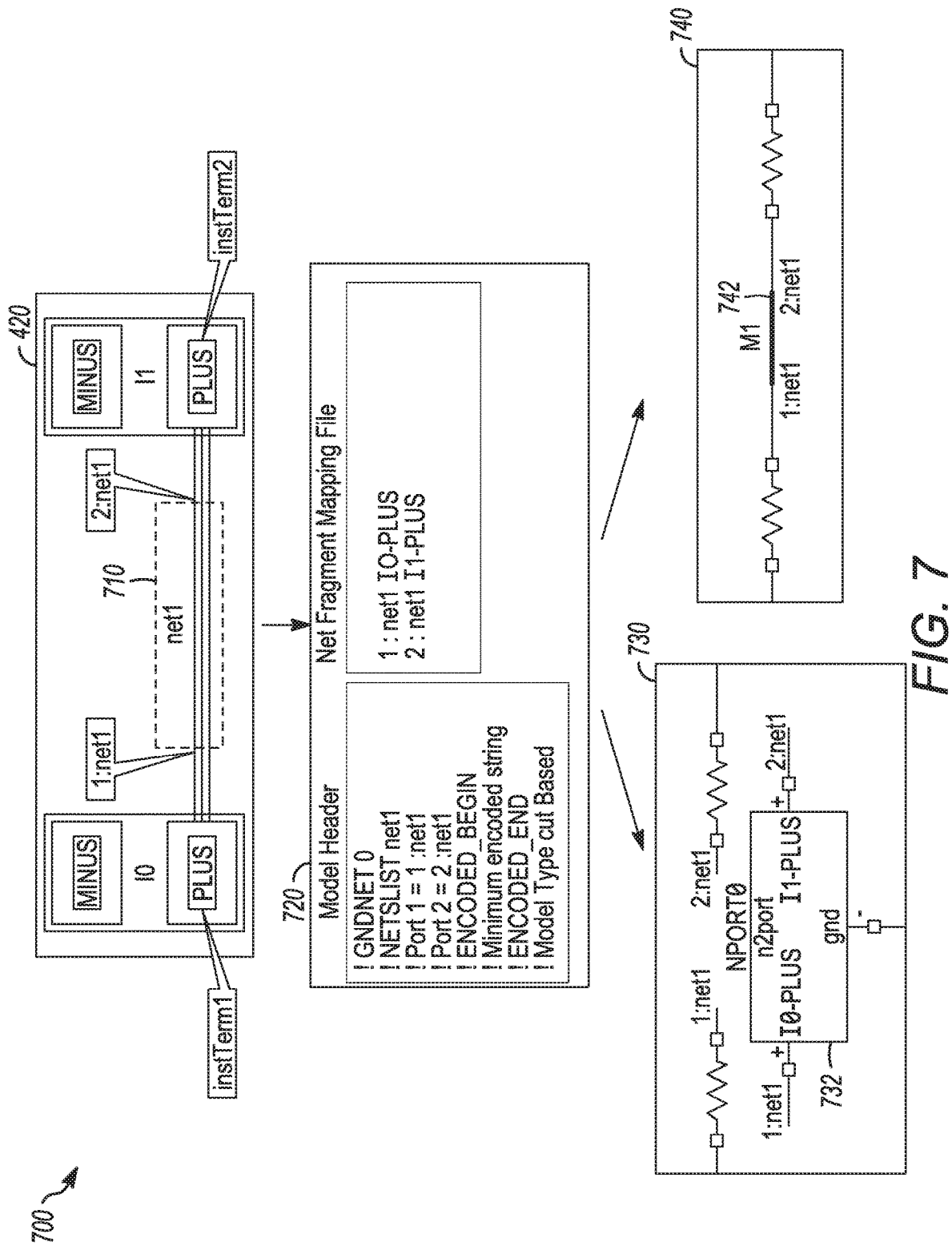
FIGS. 7 through 15 are flow diagrams illustrating operation of some embodiments with respect to schematics and layouts of example circuit designs.

FIGS. 7 through 15 are flow diagrams illustrating operation of some embodiments with respect to schematics and layouts of example circuit designs. In particular, FIG. 7 provides a flow diagram 700 illustrating example operations performed based on a cut 710 applied to the layout 420 (described above with respect to FIG. 4). The cut 710 is an example of a single two-point cut being applied to a single network, specifically the network net1 (415). As shown in FIG. 7, the network net1 is considered to be partitioned (e.g., split) into three portions based on the cut 710: a portion of the network net1 within the boundary of the cut 710; a portion of the network net1 coupled to terminal I0-PLUS; and a portion of the network net1 coupled to terminal I1-PLUS. According to various embodiments, a network fragment is generated for each of these portions.

At operation 720, a model is generated for the network fragment of the network net1 that results from and falls within the cut 710, and a network fragment mapping file is generated to map couplings between those network fragments of the network net1. As illustrated, in accordance with some embodiments, the model header for the generated model indicates that the model is a cut-based model (e.g., "ModelType=cutBased") and defines two ports (named "1:net1" and "2:net1"), which are generated (e.g., auto generated) at the two cut points where the cut 710 intersects the network net1. According to various embodiments, ports 1:net1 and 2:net1 are assigned to the network fragment corresponding to the portion of the network net1 that is disposed within the boundary of the cut 710 (represented by the dashed line). As also illustrated, in accordance with some embodiments, the network fragment mapping file indicates that port 1:net1 is to be coupled to terminal I0-PLUS, and that port 2:net1 is to be coupled to terminal I1-PLUS.

Based on the model generated at operation 720, some embodiments generate a schematic extracted view 730 for the circuit design, which illustrates a graphical representation 732 of the model generated by operation 720. Additionally, based on the network fragment mapping file generated at operation 720 and the schematic extracted view 730, some embodiments generate a back annotated schematic 740 for the circuit design by generating and applying annotations 742 to the schematic 410 of the circuit design. As shown, the annotations 742 comprise highlighting of the portion of the network net1 that was extracted by the cut 710 (to generate a model at operation 720) and that corresponds the generated model. The annotations 742 further comprise a model name label ("M1"), and port name labels ("1:net1" and "2:net1") disposed at locations corresponding to where the ports couple with the remainder of the network net1.

Figure 8:
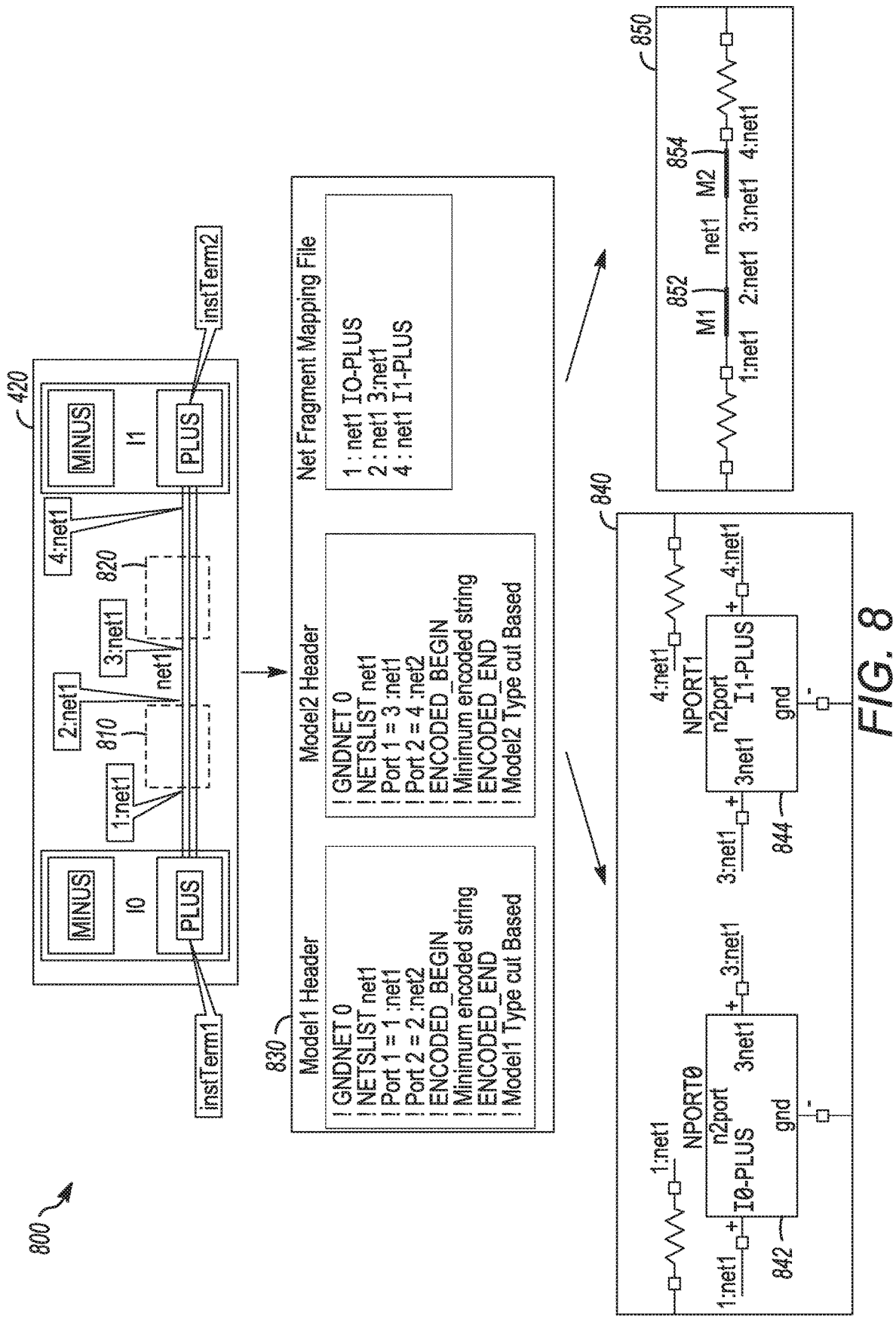

FIG. 8 provides a flow diagram 800 illustrating example operations performed based on cuts 810 and 820 applied to the layout 420 (described above with respect to FIG. 4). The cuts 810 and 820 illustrate an example of multiple two-point cuts being applied to a single network, specifically the network net1 (415). As shown in FIG. 8, the network net1 is considered to be partitioned (e.g., split) into five portions based on the cuts 810 and 820: a portion of the network net1 within the boundary of the cut 810; a portion of the network net1 within the boundary of the cut 820; a portion of the network net1 between the boundaries of the cuts 810 and 820; a portion of the network net1 coupled to terminal I0-PLUS; and a portion of the network net1 coupled to terminal I1-PLUS. According to various embodiments, a network fragment is generated for each of these portions.

At operation 830, two models are generated for the two network fragments of the network net1 that result from and fall within the cuts 810 and 820, and a network fragment mapping file is generated to map couplings between the network fragments of the network net1 that result from the cuts 810 and 820. As illustrated, in accordance with some embodiments, the model header for the generated Model1 indicates that the model is a cut-based model (e.g., "ModelType=cutBased") and defines two ports (named "1:net1" and "2:net1"), which are generated (e.g., auto generated) at the two cut points where the cut 810 intersects the network net1. According to various embodiments, ports 1:net1 and 2:net1 are assigned to the network fragment corresponding to the portion of the network net1 that is disposed within the boundary of the cut 810 (represented by the dashed line). Similarly, the model header for the generated Model2 indicates that the model is a cut-based model (e.g., "ModelType=cutBased") and defines two ports (named "3:net1" and "4:net1"), which are generated at the two cut points where the cut 820 intersects the network net1. According to various embodiments, ports 3:net1 and 4:net1 are assigned to the network fragment corresponding to the portion of the network net1 that is disposed within the boundary of the cut 820 (represented by the dashed line).

As illustrated, in accordance with some embodiments, the network fragment mapping file indicates that port 1:net1 is to be coupled to terminal I0-PLUS, that port 2:net1 is to be coupled to 3:net1, and that port 4:net1 is to be coupled to terminal I1-PLUS.

Based on the models generated at operation 830, some embodiments generate a schematic extracted view 840 for the circuit design, which illustrates graphical representations 842, 844 of Model1 and Model2 respectively. Additionally, based on the network fragment mapping file generated at operation 830 and the schematic extracted view 840, some embodiments generate a back annotated schematic 850 for the circuit design by generating and applying annotations 852, 854 to the schematic 410 of the circuit design. As shown, the annotations 852 comprise highlighting of the portion of the network net1 that was extracted by the cut 810 (to generate Model1 at operation 830) and that corresponds Model1, and the annotations 854 comprise highlighting of the portion of the network net1 that was extracted by the cut 820 (to generate Model2 at operation 830) and that corresponds Model2. The annotations 852, 854 further comprise model name labels ("M1" and "M2"), and port name labels ("1:net1," "2:net1," "3:net1," and "4:net1") disposed at locations corresponding to where the ports couple with the remainder of the network net1.

Figure 9:
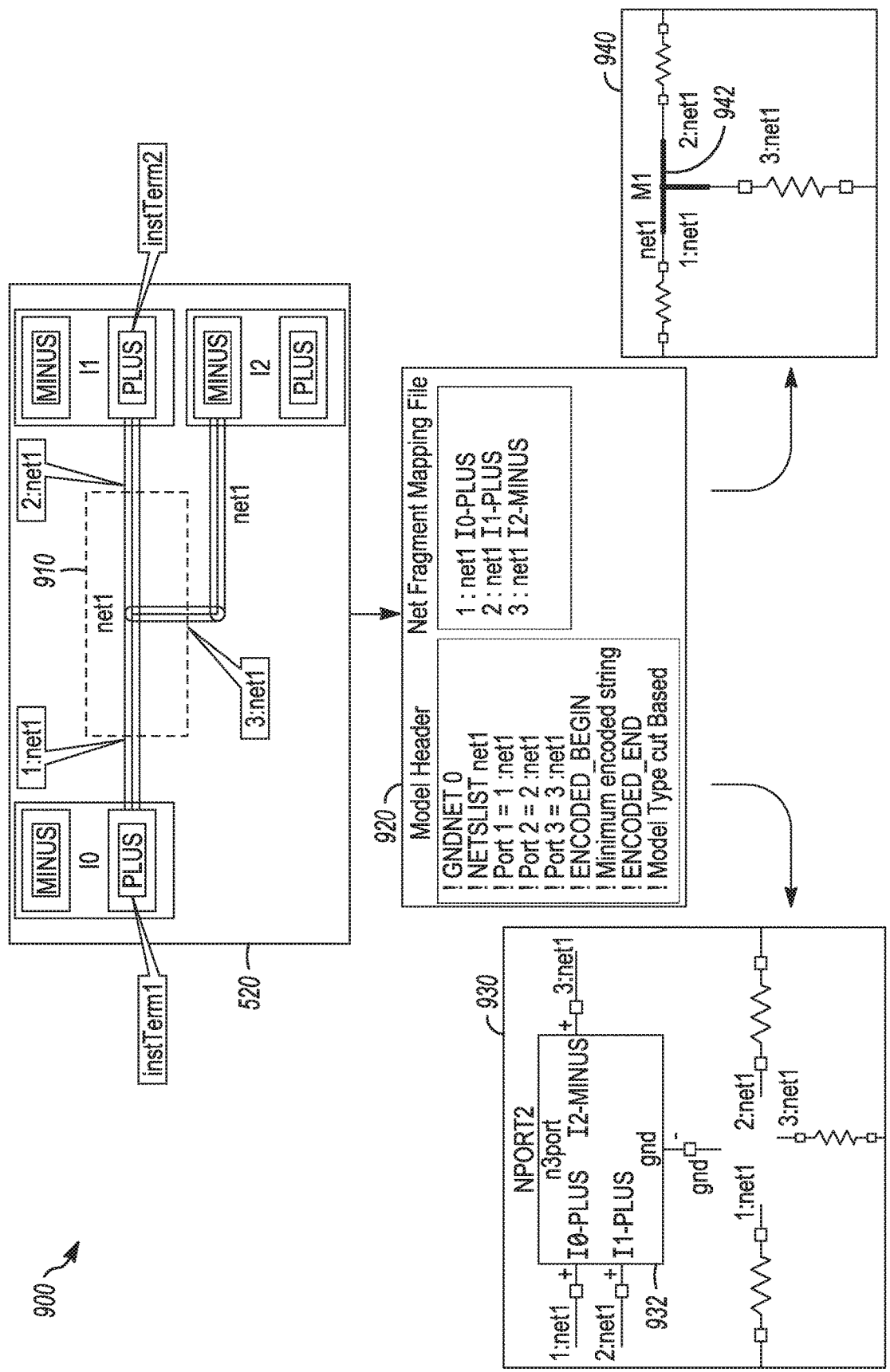

FIG. 9 provides a flow diagram 900 illustrating example operations performed based on a cut 910 applied to the layout 520 (described above with respect to FIG. 5). The cut 910 is an example of a single three-point cut being applied to a single network, specifically the network net1 (515). As shown in FIG. 9, the network net1 is considered to be partitioned (e.g., split) into four portions based on the cut 910: a portion of the network net1 within the boundary of the cut 910; a portion of the network net1 coupled to terminal I0-PLUS; a portion of the network net1 coupled to terminal I1-PLUS; and a portion of the network net coupled to terminal I2-MINUS. According to various embodiments, a network fragment is generated for each of these portions.

At operation 920, a model is generated for the network fragment of the network net1 that results from and falls within the cut 910, and a network fragment mapping file is generated to map couplings between those network fragments of the network net1. As illustrated, in accordance with some embodiments, the model header for the generated model indicates that the model is a cut-based model (e.g., "ModelType=cutBased") and defines three ports (named "1:net1," "2:net1," and "3:net1"), which are generated (e.g., auto generated) at the two cut points where the cut 910 intersects the network net1. According to various embodiments, ports 1:net1, 2:net1, and 3:net1 are assigned to the network fragment corresponding to the portion of the network net1 that is disposed within the boundary of the cut 910 (represented by the dashed line). As also illustrated, in accordance with some embodiments, the network fragment mapping file indicates that port 1:net1 is to be coupled to terminal I0-PLUS, that port 2:net1 is to be coupled to terminal I-PLUS, and that port 3:net1 is to be coupled to terminal I2-MINUS.

Based on the model generated at operation 920, some embodiments generate a schematic extracted view 930 for the circuit design, which illustrates a graphical representation 932 of the model generated by operation 920. Additionally, based on the network fragment mapping file generated at operation 920 and the schematic extracted view 930, some embodiments generate a back annotated schematic 940 for the circuit design by generating and applying annotations 942 to the schematic 510 of the circuit design. As shown, the annotations 942 comprise highlighting of the portion of the network net1 that was extracted by the cut 910 (to generate a model at operation 920) and that corresponds the generated model. The annotations 942 further comprise a model name label ("M1"), and port name labels ("1:net1," "2:net1," and "3:net1") disposed at locations corresponding to where the ports couple with the remainder of the network net1.

Figure 10:
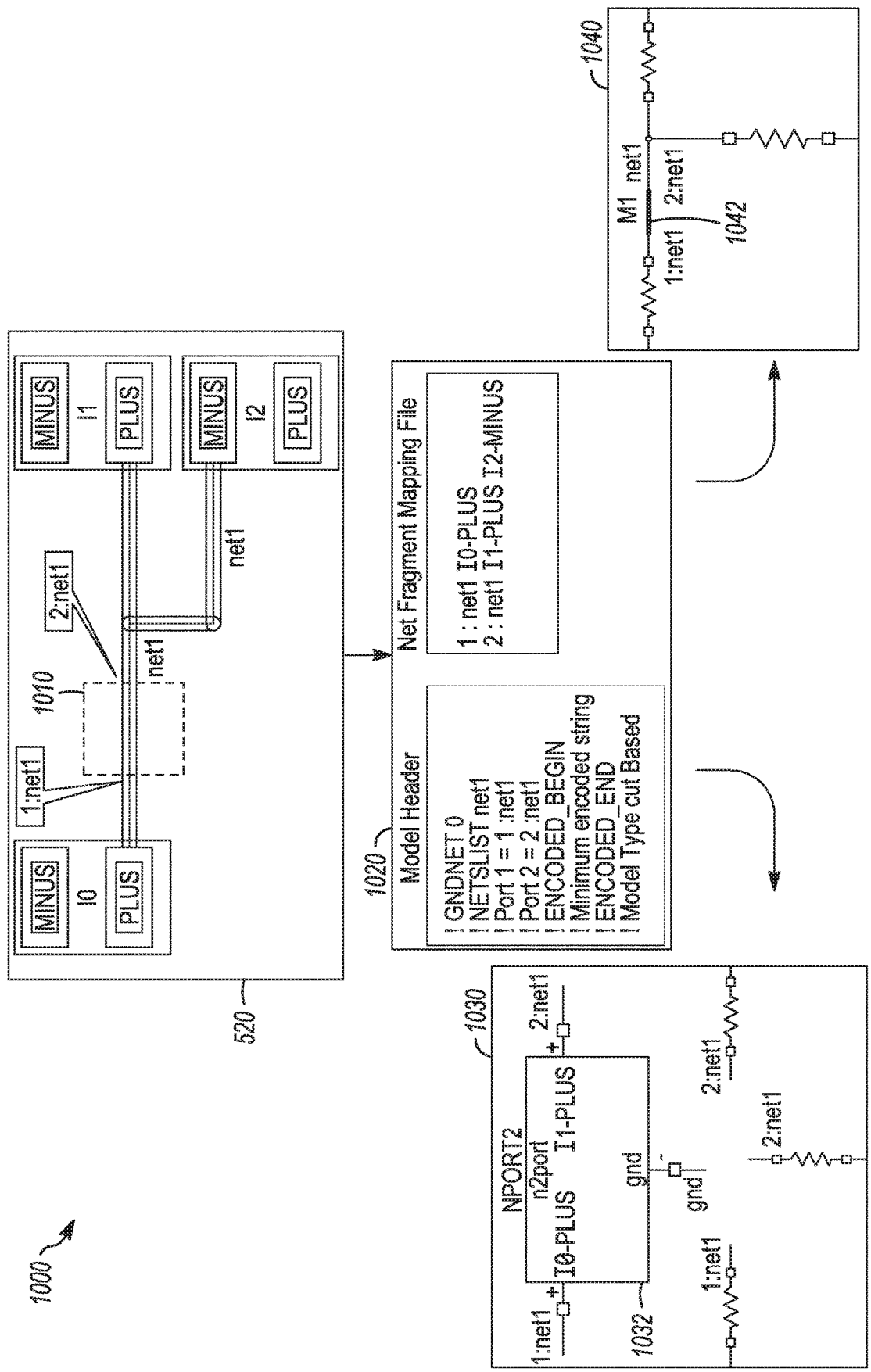

FIG. 10 provides a flow diagram 1000 illustrating example operations performed based on a cut 1010 applied to the layout 520 (described above with respect to FIG. 5). The cut 1010 is an example of a single two-point cut being applied to a single network, specifically the network net1 (515), that results in a model port having two or more connections. As shown in FIG. 10, the network net1 is considered to be partitioned (e.g., split) into three portions based on the cut 1010: a portion of the network net1 within the boundary of the cut 1010; a portion of the network net1 coupled to terminal I0-PLUS; and a portion of the network net1 coupled to terminal I1-PLUS and terminal I2-MINUS. According to various embodiments, a network fragment is generated for each of these portions.

At operation 1020, a model is generated for the network fragment of the network net1 that results from and falls within the cut 1010, and a network fragment mapping file is generated to map couplings between those network fragments of the network net1. As illustrated, in accordance with some embodiments, the model header for the generated model indicates that the model is a cut-based model (e.g., "ModelType=cutBased") and defines two ports (named "1:net1," and "2:net1"), which are generated (e.g., auto generated) at the two cut points where the cut 1010 intersects the network net1. According to various embodiments, ports 1:net1 and 2:net1 are assigned to the network fragment corresponding to the portion of the network net1 that is disposed within the boundary of the cut 1010 (represented by the dashed line). As also illustrated, in accordance with some embodiments, the network fragment mapping file indicates that port 1:net1 is to be coupled to terminal I0-PLUS, and that port 2:net1 is to be coupled to terminal I-PLUS and terminal I2-MINUS (which is indicated by the entry for port 2:net1 listing both terminal I1-PLUS and terminal I2-MINUS). As listed in the network fragment mapping file, the entry for port 2:net1 lists both terminal I1-PLUS and terminal I2-MINUS as having the same potential.

Based on the model generated at operation 1020, some embodiments generate a schematic extracted view 1030 for the circuit design, which illustrates a graphical representation 1032 of the model generated by operation 1020. Additionally, based on the network fragment mapping file generated at operation 1020 and the schematic extracted view 1030, some embodiments generate a back annotated schematic 1040 for the circuit design by generating and applying annotations 1042 to the schematic 510 of the circuit design. As shown, the annotations 1042 comprise highlighting of the portion of the network net that was extracted by the cut 1010 (to generate a model at operation 1020) and that corresponds the generated model. The annotations 1042 further comprise a model name label ("M1"), and port name labels ("1:net1," and "2:net1") disposed at locations corresponding to where the ports couple with the remainder of the network net1.

Figure 11:
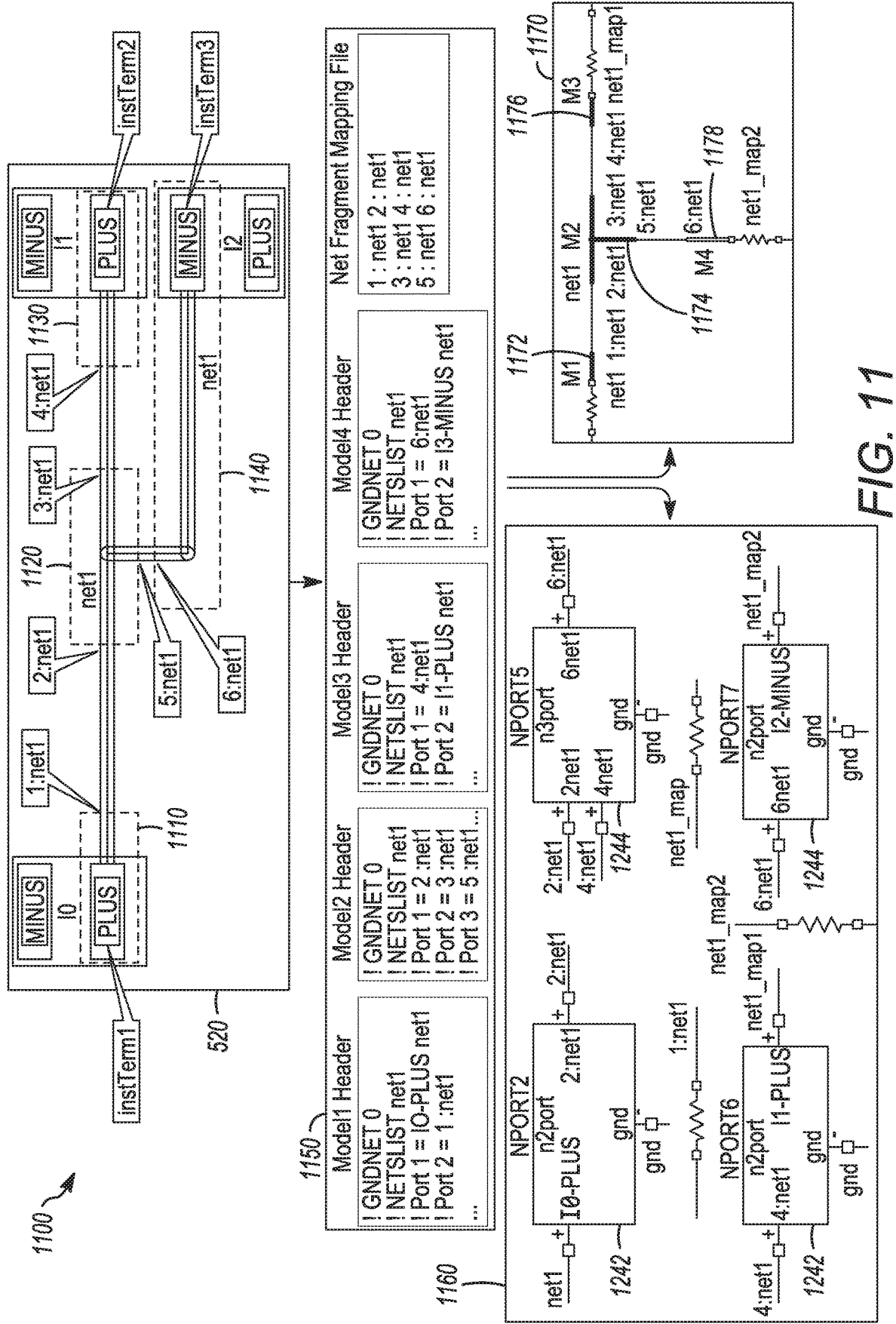

FIG. 11 provides a flow diagram 1100 illustrating example operations performed based on cuts 1110, 1120, 1130, and 1140 applied to the layout 520 (described above with respect to FIG. 5). The cuts 1110 through 1140 illustrate an example of multiple two-point and three-point cuts being applied to a single network, specifically the network net1 (515). As shown in FIG. 11, the network net1 is considered to be partitioned (e.g., split) into seven portions based on the cuts 1110 through 1140: a portion of the network net1 within the boundary of the cut 1110; a portion of the network net1 within the boundary of the cut 1120; a portion of the network net1 within the boundary of the cut 1130; a portion of the network net1 within the boundary of the cut 1140; a portion of the network net1 between the boundaries of the cuts 1110 and 1120; a portion of the network net1 between the boundaries of the cuts 1120 and 1130; and a portion of the network net1 between the boundaries of the cuts 1130 and 1140. According to various embodiments, a network fragment is generated for each of these portions. As shown, the portion of the network net1 within the boundary of the cut 1110 includes terminal I0-PLUS, the portion of the network net1 within the boundary of the cut 1130 includes terminal I1-PLUS, and the portion of the network net1 within the boundary of the cut 1140 includes terminal I2-MINUS.

At operation 1150, two models are generated for the two network fragments of the network net1 that result from and fall within the cuts 1110 through 1140, and a network fragment mapping file is generated to map couplings between the network fragments of the network net1 that result from the cuts 1110 through 1140. As illustrated, in accordance with some embodiments, the model header for the generated Model1 indicates that the model is a cut-based model (e.g., "ModelType=cutBased") and defines two ports (named "I0-PLUS net1" and "1:net1"), which are respectively generated (e.g., auto generated) for the terminal I-PLUS and the single cut point where the cut 1110 intersects the network net1. According to various embodiments, ports I0-PLUS net1 and 1:net1 are assigned to the network fragment corresponding to the portion of the network net1 that is disposed within the boundary of the cut 1110 (represented by the dashed line).

The model header for the generated Model2 indicates that the model is a cut-based model (e.g., "ModelType=cutBased") and defines three ports (named "2:net1," "3:net1," and "5:net1"), which are generated at the three cut points where the cut 1120 intersects the network net1. According to various embodiments, ports 2:net1, 3:net1 and 5:net1 are assigned to the network fragment corresponding to the portion of the network net1 that is disposed within the boundary of the cut 1120 (represented by the dashed line).

The model header for the generated Model3 indicates that the model is a cut-based model (e.g., "ModelType=cutBased") and defines two ports (named "I1-PLUS net1" and "4:net1"), which are respectively generated (e.g., auto generated) for the terminal I1-PLUS and the single cut point where the cut 1130 intersects the network net1. According to various embodiments, ports I1-PLUS net1 and 4:net1 are assigned to the network fragment corresponding to the portion of the network net1 that is disposed within the boundary of the cut 1130 (represented by the dashed line).

The model header for the generated Model4 indicates that the model is a cut-based model (e.g., "ModelType=cutBased") and defines two ports (named "I2-MINUS net1" and "6:net1"), which are respectively generated (e.g., auto generated) for the terminal I2-MINUS and the single cut point where the cut 1140 intersects the network net1. According to various embodiments, ports I2-MINUS net1 and 6:net1 are assigned to the network fragment corresponding to the portion of the network net1 that is disposed within the boundary of the cut 1140 (represented by the dashed line).

As also illustrated, in accordance with some embodiments, the network fragment mapping file indicates that port 1:net1 is to be coupled to port 2:net1, that port 3:net1 is to be coupled to port 4:net1, and that port 5:net1 is to be coupled to port 6:net1.

Based on the model generated at operation 1150, some embodiments generate a schematic extracted view 1160 for the circuit design, which illustrates graphical representations 1162, 1164, 1166, 1168 of Model1, Model2, Model3, and Model4 respectively. Additionally, based on the network fragment mapping file generated at operation 1150 and the schematic extracted view 1160, some embodiments generate a back annotated schematic 1170 for the circuit design by generating and applying annotations 1172, 1174, 1176, 1178 to the schematic 510 of the circuit design. As shown, the annotations 1172 comprise highlighting of the portion of the network net1 that was extracted by the cut 1110 (to generate a model at operation 1150) and that corresponds to the generated model. The annotations 1172 further comprise a model name label ("M1"), and port name labels ("net1" and "1:net1") disposed at locations corresponding to where the ports couple with the remainder of the network net1.

The annotations 1174 comprise highlighting of the portion of the network net1 that was extracted by the cut 1120 (to generate a model at operation 1150) and that corresponds to the generated model. The annotations 1174 further comprise a model name label ("M2"), and port name labels ("2:net1" and "3:net1") disposed at locations corresponding to where the ports couple with the remainder of the network net1.

The annotations 1176 comprise highlighting of the portion of the network net1 that was extracted by the cut 1130 (to generate a model at operation 1150) and that corresponds to the generated model. The annotations 1176 further comprise a model name label ("M3"), and port name labels ("4:net1" and "net1_map1") disposed at locations corresponding to where the ports couple with the remainder of the network net1.

The annotations 1178 comprise highlighting of the portion of the network net1 that was extracted by the cut 1140 (to generate a model at operation 1150) and that corresponds to the generated model. The annotations 1178 further comprise a model name label ("M4"), and port name labels ("6:net1" and "net1_map2") disposed at locations corresponding to where the ports couple with the remainder of the network net1.

Figure 12:
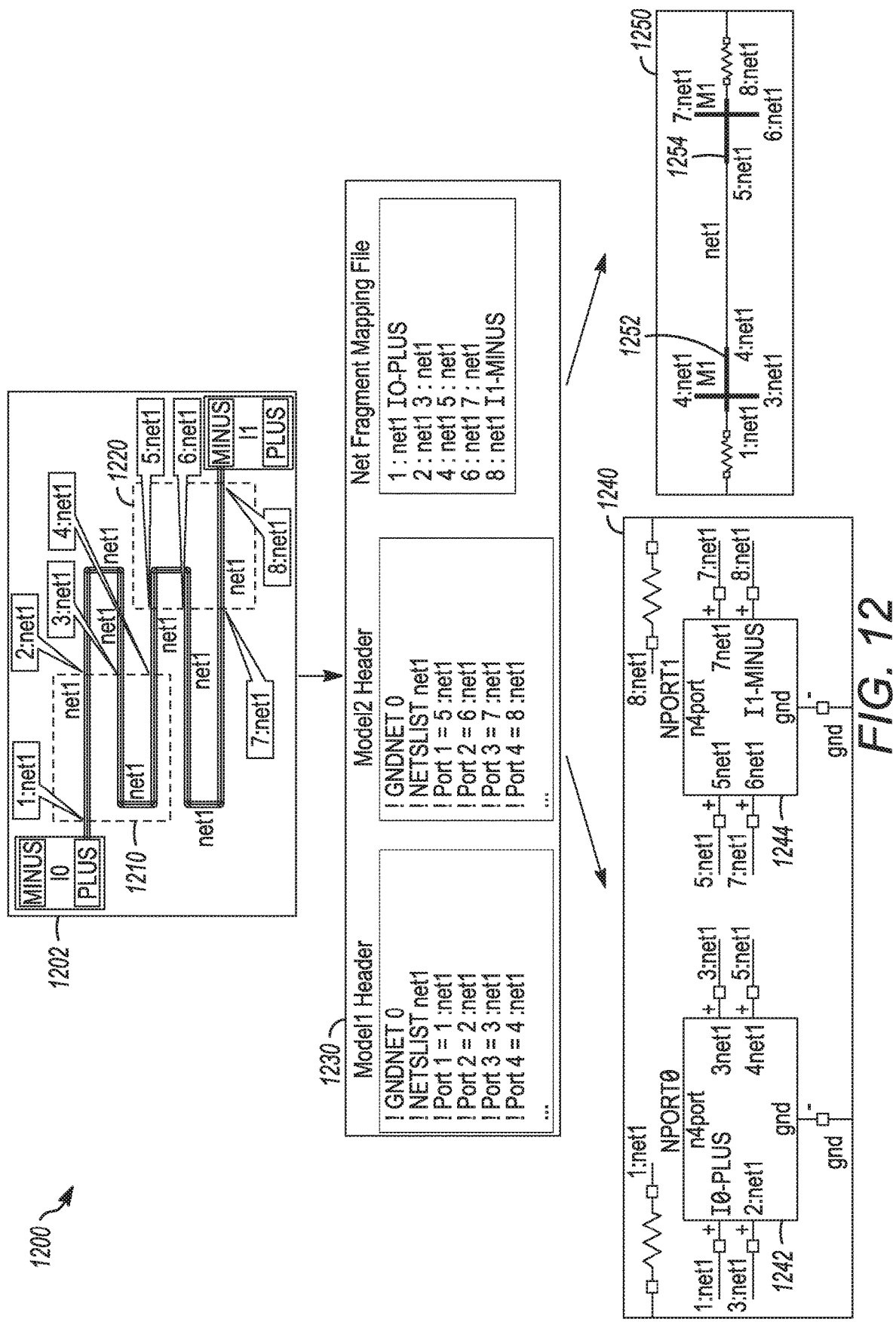

FIG. 12 provides a flow diagram 1200 illustrating example operations performed based on cuts 1210 and 1220 applied to a schematic 1202, which is similar to the layout 420 (described above with respect to FIG. 4) with a complex layout. The cuts 1210 and 1220 illustrate an example of multiple two-point cuts being applied to a single network, specifically network net1 of schematic 1202. As shown in FIG. 12, the network net1 is considered to be partitioned (e.g., split) into seven portions based on the cuts 1210 and 1220: a portion of the network net1 within the boundary of the cut 1210; a portion of the network net1 within the boundary of the cut 1220; a portion of the network net1 running from the boundary of the cut 1210 back to the boundary of the cut 1210; a portion of the network net1 between the boundaries of the cuts 1210 and 1220; a portion of the network net1 running from the boundary of the cut 1220 back to the boundary of the cut 1220; a portion of the network net1 coupled to terminal I0-PLUS; and a portion of the network net1 coupled to terminal I1-PLUS. According to various embodiments, a network fragment is generated for each of these portions.

At operation 1230, two models are generated for the two network fragments of the network net1 that result from and fall within the cuts 1210 and 1220, and a network fragment mapping file is generated to map couplings between the network fragments of the network net1 that result from the cuts 1210 and 1220. As illustrated, in accordance with some embodiments, the model header for the generated Model1 indicates that the model is a cut-based model (e.g., "ModelType=cutBased") and defines four ports (named "net1," "2:net1," "3:net1," and "4:net1"), which are generated (e.g., auto generated) at the four cut points where the cut 1210 intersects the network net1. According to various embodiments, ports 1:net1, 2:net1, 3:net1, and 4:net1 are assigned to the network fragment corresponding to the portion of the network net1 that is disposed within the boundary of the cut 1210 (represented by the dashed line). Similarly, the model header for the generated Model2 indicates that the model is a cut-based model (e.g., "ModelType=cutBased") and defines four ports (named "5:net1," "6:net1," "7:net1," and "8:net1"), which are generated at the four cut points where the cut 1220 intersects the network net. According to various embodiments, ports 5:net1, 6:net1, 7:net1, and 8:net1 are assigned to the network fragment corresponding to the portion of the network net1 that is disposed within the boundary of the cut 1220 (represented by the dashed line).

As illustrated, in accordance with some embodiments, the network fragment mapping file indicates that port 1:net1 is to be coupled to terminal I0-PLUS, that port 2:net1 is to be coupled to 3:net1, that port 4:net1 is to be coupled to 5:net1, that port 6:net1 is to be coupled to 7:net1, and that port 8:net1 is to be coupled to I-MINUS.

Based on the models generated at operation 1230, some embodiments generate a schematic extracted view 1240 for the circuit design, which illustrates graphical representations 1242, 1244 of Model1 and Model2 respectively. Additionally, based on the network fragment mapping file generated at operation 1230 and the schematic extracted view 1240, some embodiments generate a back annotated schematic 1250 for the circuit design by generating and applying annotations 1252, 1254 to the schematic 410 of the circuit design. As shown, the annotations 1252 comprise highlighting of the portion of the network net1 that was extracted by the cut 1210 (to generate Model1 at operation 1230) and that corresponds to Model1, and the annotations 1254 comprise highlighting of the portion of the network net1 that was extracted by the cut 1220 (to generate Model2 at operation 1230) and that corresponds to Model2. The annotations 1252, 1254 further comprise a model name labels ("M1" and "M2"), and port name labels ("1:net1," "2:net1," "3:net1," "4:net1," "5:net1," "6:net1," "7:net1," and "8:net1,") disposed at locations corresponding to where the ports couple with the remainder of the network net1.

Figure 13:
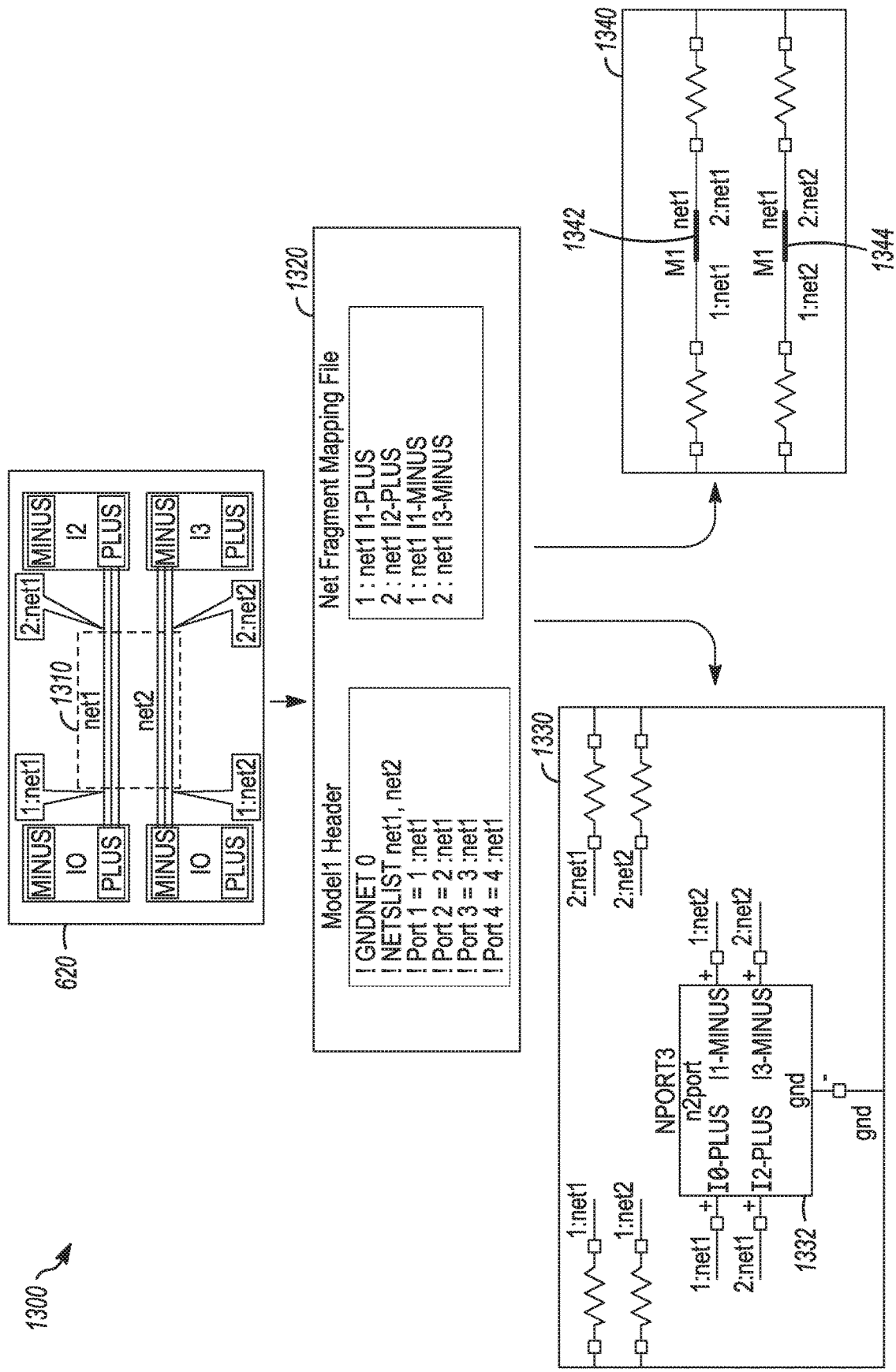

FIG. 13 provides a flow diagram 1300 illustrating example operations performed based on a cut 1310 applied to the layout 620 (described above with respect to FIG. 6). The cut 1310 is an example of a single four-point cut being applied to two networks, specifically the network net1 (615) and the network net2 (617). As shown in FIG. 13, the network net is considered to be partitioned (e.g., split) into three portions based on the cut 1310: a portion of the network net1 within the boundary of the cut 1310; a portion of the network net1 coupled to terminal I0-PLUS; and a portion of the network net1 coupled to terminal I2-PLUS. According to various embodiments, a network fragment is generated for each of these portions. Additionally, the network net2 is considered to be partitioned (e.g., split) into three portions based on the cut 1310: a portion of the network net2 within the boundary of the cut 1310; a portion of the network net2 coupled to terminal I1-MINUS; and a portion of the network net2 coupled to terminal I3-MINUS. According to various embodiments, a network fragment is generated for each of these portions.

At operation 1320, a single model is generated for the network fragment of the network net1 and the network fragment of network net2 that results from and falls within the cut 1310, and a network fragment mapping file is generated to map couplings between those network fragments of the network net1 and the network net2. As illustrated, in accordance with some embodiments, the model header for the generated model indicates that the model is a cut-based model (e.g., "ModelType=cutBased") and defines four ports (named "1:net1," "2:net1," "1:net2" and "2:net2"), which are generated (e.g., auto generated) at the two cut points where the cut 1310 intersects the network net1 and at the two cut points where the cut 1310 intersects the network net2. According to various embodiments, ports 1:net1 and 2:net1 are assigned to the network fragment corresponding to the portion of the network net1 that is disposed within the boundary of the cut 1310 (represented by the dashed line), and ports 1:net2 and 2:net2 are assigned to the network fragment corresponding to the portion of the network net1 that is disposed within the boundary of the cut 1310. As also illustrated, in accordance with some embodiments, the network fragment mapping file indicates that port 1:net1 is to be coupled to terminal I0-PLUS, that port 2:net1 is to be coupled to terminal I2-PLUS, that port 1:net2 is to be coupled to terminal I1-MINUS, that port 2:net2 is to be coupled to terminal I3-MINUS.

Based on the model generated at operation 1320, some embodiments generate a schematic extracted view 1330 for the circuit design, which illustrates a graphical representation 1332 of the model generated by operation 1320. Additionally, based on the network fragment mapping file generated at operation 1320 and the schematic extracted view 1330, some embodiments generate a back annotated schematic 1340 for the circuit design by generating and applying annotations 1342, 1344 to the schematic 610 of the circuit design. As shown, the annotations 1342 comprise highlighting of the portion of the network net1 that was extracted by the cut 1310 (to generate a model at operation 1320) and that corresponds to the generated model. The annotations 1342 further comprise a model name label ("M1"), and port name labels ("1:net1" and "2:net1") disposed at locations corresponding to where the ports couple with the remainder of the network net1.

Likewise, the annotations 1344 comprise highlighting of the portion of the network net2 that was extracted by the cut 1310 (to generate a model at operation 1320) and that corresponds to the generated model. The annotations 1344 further comprise a model name label ("M1"), and port name labels ("1:net2" and "2:net2") disposed at locations corresponding to where the ports couple with the remainder of the network net2.

Figure 14:
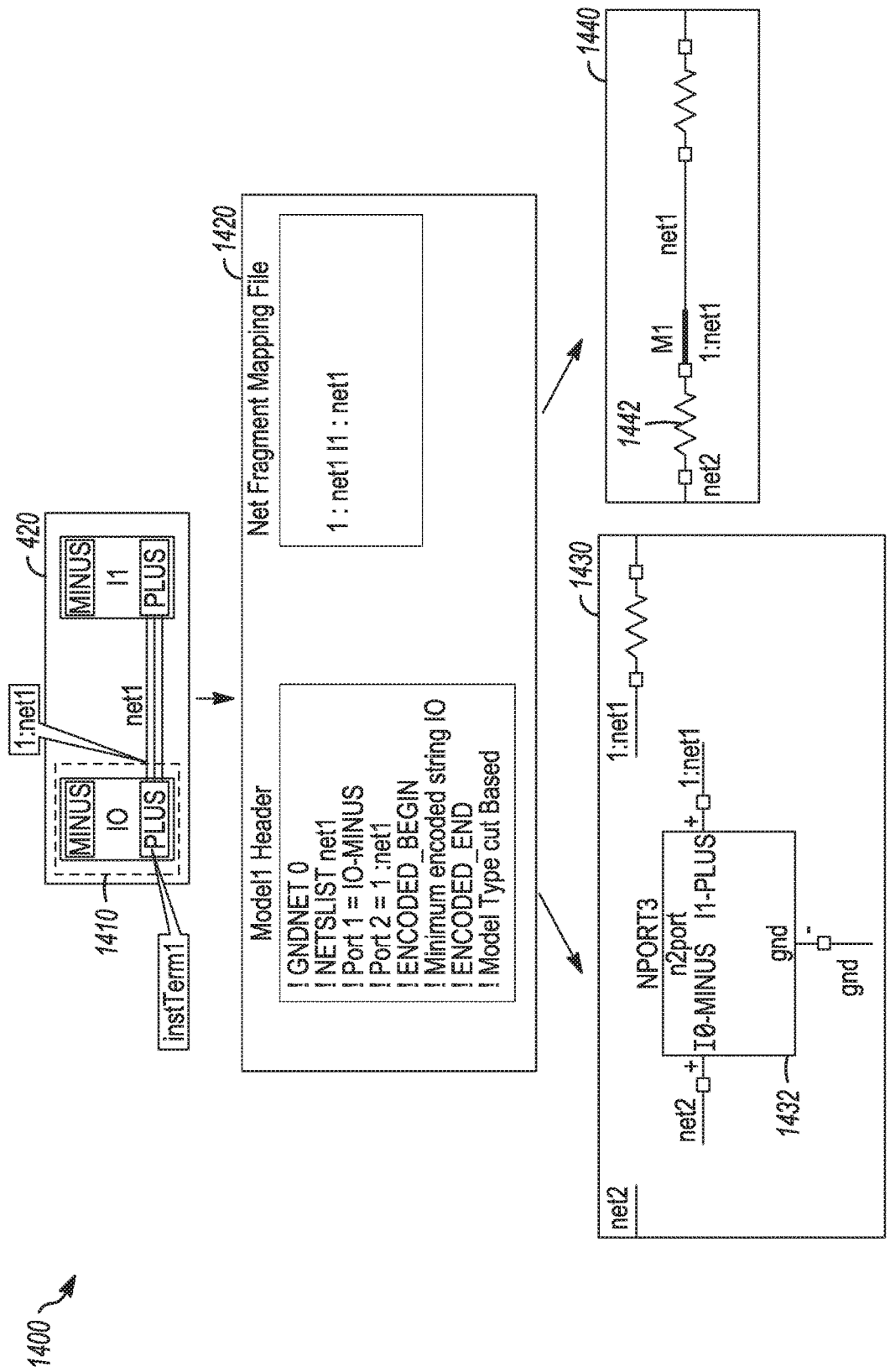

FIG. 14 provides a flow diagram 1400 illustrating example operations performed based on a cut 1410 applied to the layout 420 (described above with respect to FIG. 4). The cut 1410 is an example of a single one-point cut that includes an embedded component I0 and that is applied to a single network, specifically the network net1 (415). As shown in FIG. 14, the network net1 is considered to be partitioned (e.g., split) into two portions based on the cut 1410: a portion of the network net1 within the boundary of the cut 1410 (which includes component I0 and its terminals I0-MINUS and I0-PLUS); and a portion of the network net1 coupled to terminal I1-PLUS. According to various embodiments, a network fragment is generated for each of these portions.

At operation 1420, a model is generated for the network fragment of the network net1 and the component I0 that falls within the cut 1410, and a network fragment mapping file is generated to map couplings between those network fragments of the network net1. As illustrated, in accordance with some embodiments, the model header for the generated model indicates that the model is a cut-based model (e.g., "ModelType=cutBased") and defines two ports (named "1:net1" and "I0-MINUS"), which are generated (e.g., auto generated) at the cut point where the cut 1410 intersects the network net1 and at the cut point where the cut 1410 intersects coupling between the component I0 and another network (network net2). According to various embodiments, ports 1:net1 and I0-MINUS are assigned to the network fragment corresponding to the portion of the network net1 that is disposed within the boundary of the cut 1410 (represented by the dashed line). As also illustrated, in accordance with some embodiments, the network fragment mapping file indicates that port 1:net1 is to be coupled to terminal I1-PLUS.

Based on the model generated at operation 1420, some embodiments generate a schematic extracted view 1430 for the circuit design, which illustrates a graphical representation 1432 of the model generated by operation 1420. Additionally, based on the network fragment mapping file generated at operation 1420 and the schematic extracted view 1430, some embodiments generate a back annotated schematic 1440 for the circuit design by generating and applying annotations 1442 to the schematic 410 of the circuit design. As shown, the annotations 1442 comprise highlighting of the portion of the network net1 that was extracted by the cut 1410 (to generate a model at operation 1420) and that corresponds to the generated model. The annotations 1442 further comprise a model name label ("M1"), and port name labels ("1:net1" and "net2") disposed at locations corresponding to where the ports couple with the remainder of the network net1.

Figure 15:
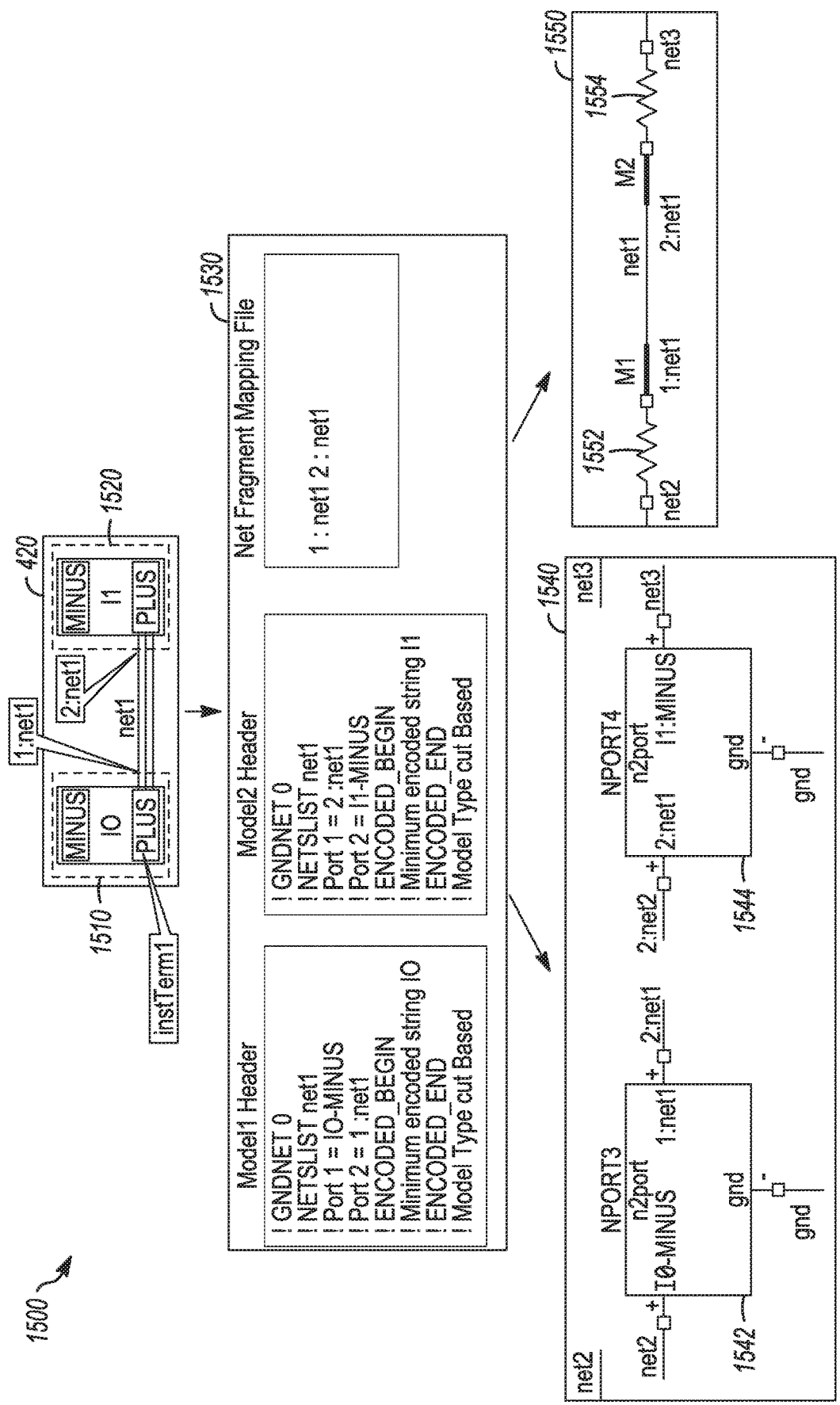

FIG. 15 provides a flow diagram 1500 illustrating example operations performed based on cuts 1510 and 1520 applied to the layout 420 (described above with respect to FIG. 4). The cuts 1510 and 1520 illustrate multiple one-point cuts that include multiple embedded components (I0 and I1) and that are applied to a single network, specifically the network net1 (415). As shown in FIG. 15, the network net1 is considered to be partitioned (e.g., split) into three portions based on the cuts 1510 and 1520: a portion of the network net1 within the boundary of the cut 1510 (which includes component I0 and its terminals I0-MINUS and I0-PLUS); a portion of the network net1 within the boundary of the cut 1520 (which includes component I1 and its terminals I1-MINUS and I1-PLUS); and a portion of the network net1 between the boundaries of the cuts 1510 and 1520. According to various embodiments, a network fragment is generated for each of these portions.

At operation 1530, two models are generated for the two network fragments of the network net1 that result from and fall within the cuts 1510 and 1520, and a network fragment mapping file is generated to map couplings between the network fragments of the network net1 that results from the cuts 1510 and 1520. As illustrated, in accordance with some embodiments, the model header for the generated Model1 indicates that the model is a cut-based model (e.g., "ModelType=cutBased") and defines two ports (named "1:net1" and "I0-MINUS"), which are generated (e.g., auto generated) at the cut point where the cut 1510 intersects the network net1 and at the cut point where the cut 1510 intersects coupling between the component I0 and another network (network net2). According to various embodiments, ports 1:net1 and I0-MINUS are assigned to the network fragment corresponding to the portion of the network net1 that is disposed within the boundary of the cut 1510 (represented by the dashed line). Similarly, the model header for the generated Model2 indicates that the model is a cut-based model (e.g., "ModelType=cutBased") and defines two ports (named "2:net1" and "I1-MINUS"), which are generated (e.g., auto generated) at the cut point where the cut 1520 intersects the network net1 and at the cut point where the cut 1520 intersects coupling between the component I1 and another network (network net3). According to various embodiments, ports 2:net1 and I-MINTS are assigned to the network fragment corresponding to the portion of the network net1 that is disposed within the boundary of the cut 1520 (represented by the dashed line). As illustrated, in accordance with some embodiments, the network fragment mapping file indicates that port 1:net1 is to be coupled to terminal 2:net1.

Based on the models generated at operation 1530, some embodiments generate a schematic extracted view 1540 for the circuit design, which illustrates graphical representations 1542, 1544 of Model1 and Model2 respectively. Additionally, based on the network fragment mapping file generated at operation 1530 and the schematic extracted view 1540, some embodiments generate a back annotated schematic 1550 for the circuit design by generating and applying annotations 1552, 1554 to the schematic 410 of the circuit design. As shown, the annotations 1552 comprise highlighting of the portion of the network net1 that was extracted by the cut 1510 (to generate Model1 at operation 1530) and that corresponds to Model1, and the annotations 1554 comprise highlighting of the portion of the network net1 that was extracted by the cut 1520 (to generate Model2 at operation 1530) and that corresponds to Model2. The annotations 1552, 1554 further comprise a model name labels ("M1" and "M2"), and port name labels ("1:net1," "net2," "2:net1" and "net3") disposed at locations corresponding to where the ports couple with the remainder of the network net1.

Figure 16:
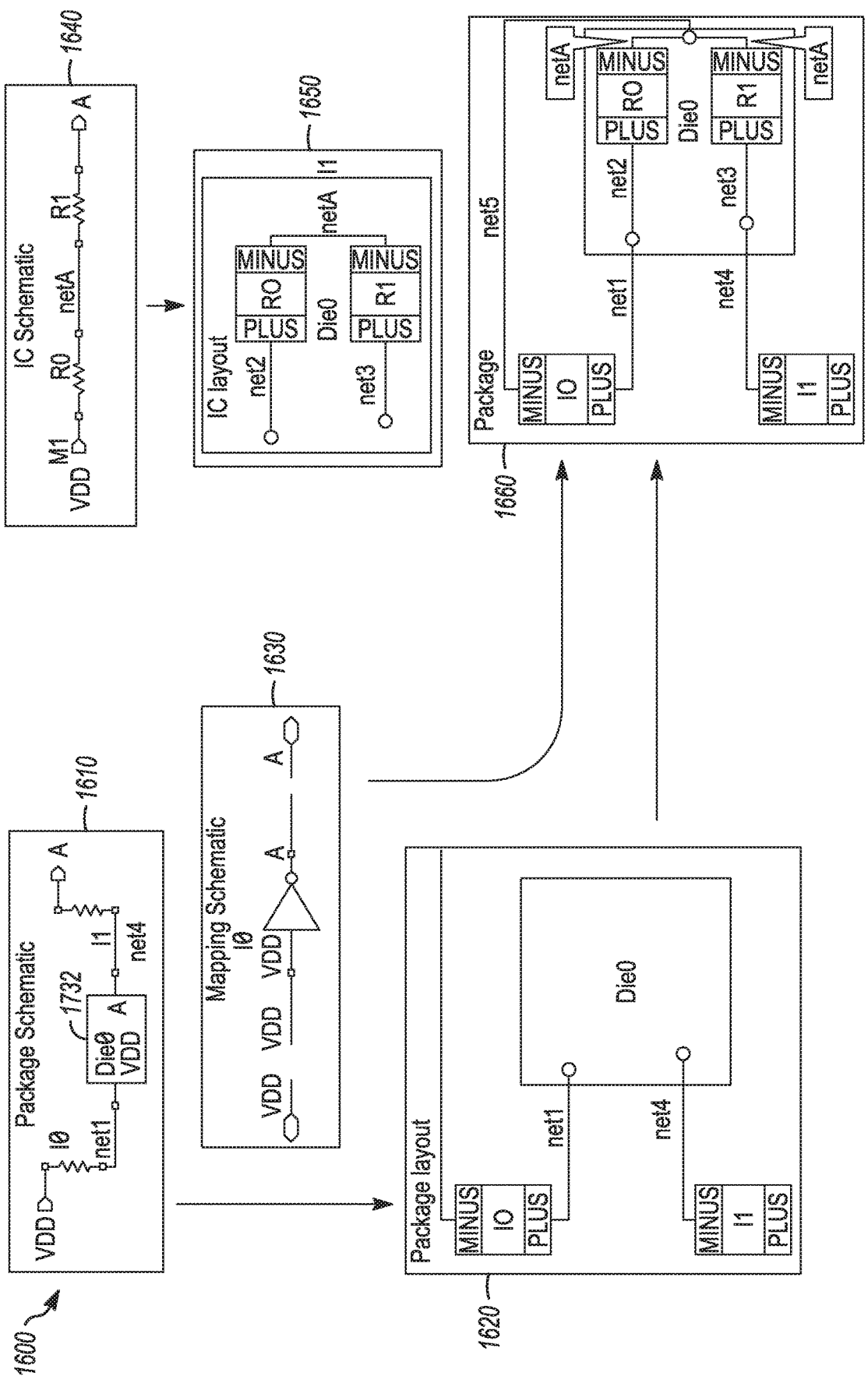
FIG. 16 illustrates schematics and layouts of an example circuit design that comprises a cross fabric and that can be processed by some embodiments.

FIG. 16 illustrates schematics and layouts relating to an example circuit design that includes a cross-fabric, and that can be processed by some embodiments. In particular, FIG. 16 illustrates a coupling between a circuit package and an IC, which represents an example of a cross-fabric within the circuit design. Other cross fabrics can be formed by a coupling between an IC and a circuit board fabric, and a circuit package and a circuit board fabric. As shown, FIG. 16 includes a circuit package schematic 1610, a circuit package layout 1620, a mapping schematic 1630, an IC schematic 1640, an IC layout 1650, and a cross-fabric package layout 1660 for the combination of the IC layout 1650 with the circuit package layout 1620. The mapping schematic 1630 illustrates an intermediate schematic for mapping pins of the circuit package schematic 1610 with pins of the IC schematic 1640; the intermediate schematic can render the IC interface pins unique, given that an IC schematic can have duplicate pins. More regarding partial selection-based model extraction with respect to the layout 1660 of FIG. 16 is discussed with respect to FIGS. 7, 8, 12, 14, and 15.

Figure 17:
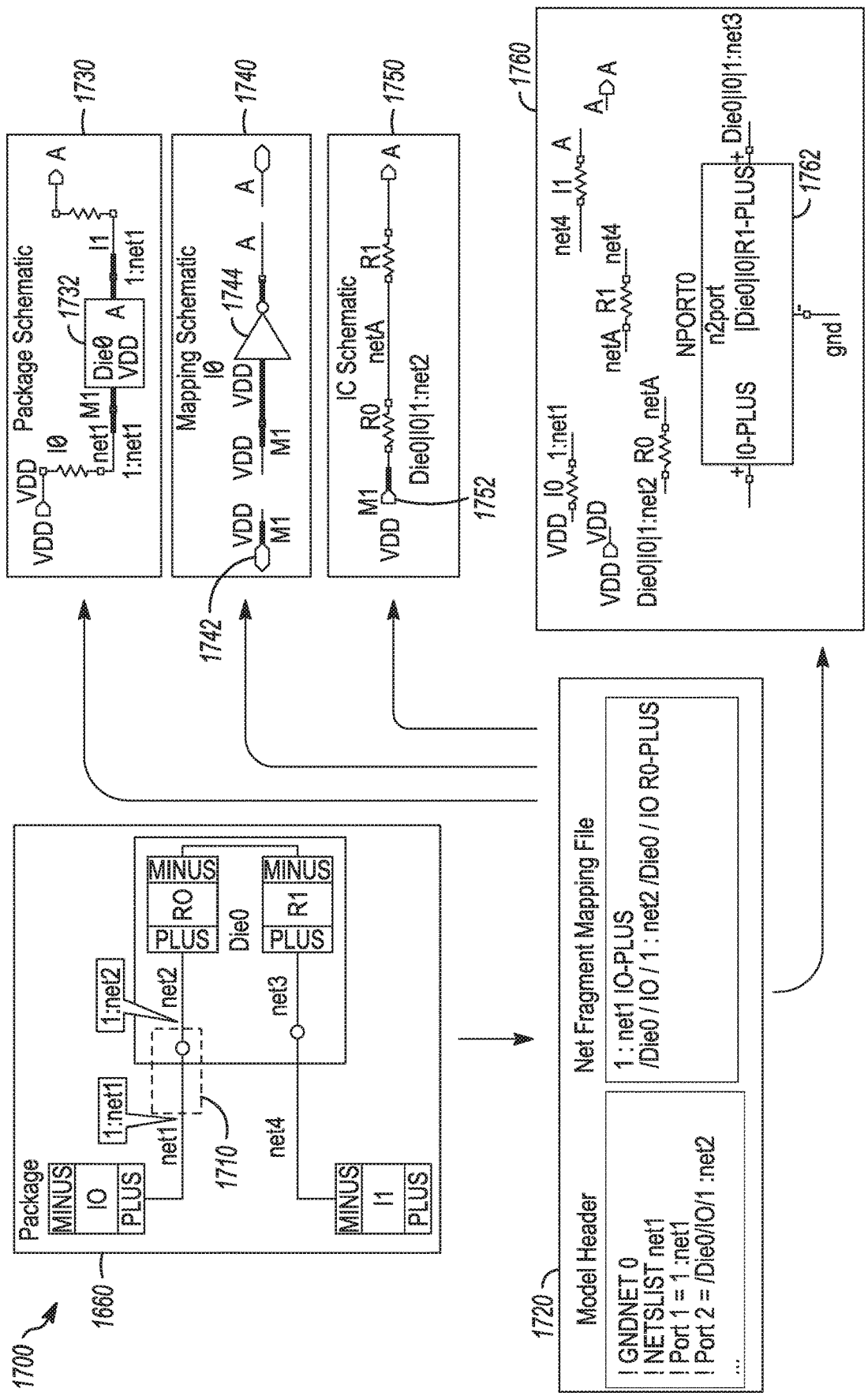
FIGS. 17 and 18 are flow diagrams illustrating operation of some embodiments with respect to schematics and layouts of an example circuit design.
Figure 18:
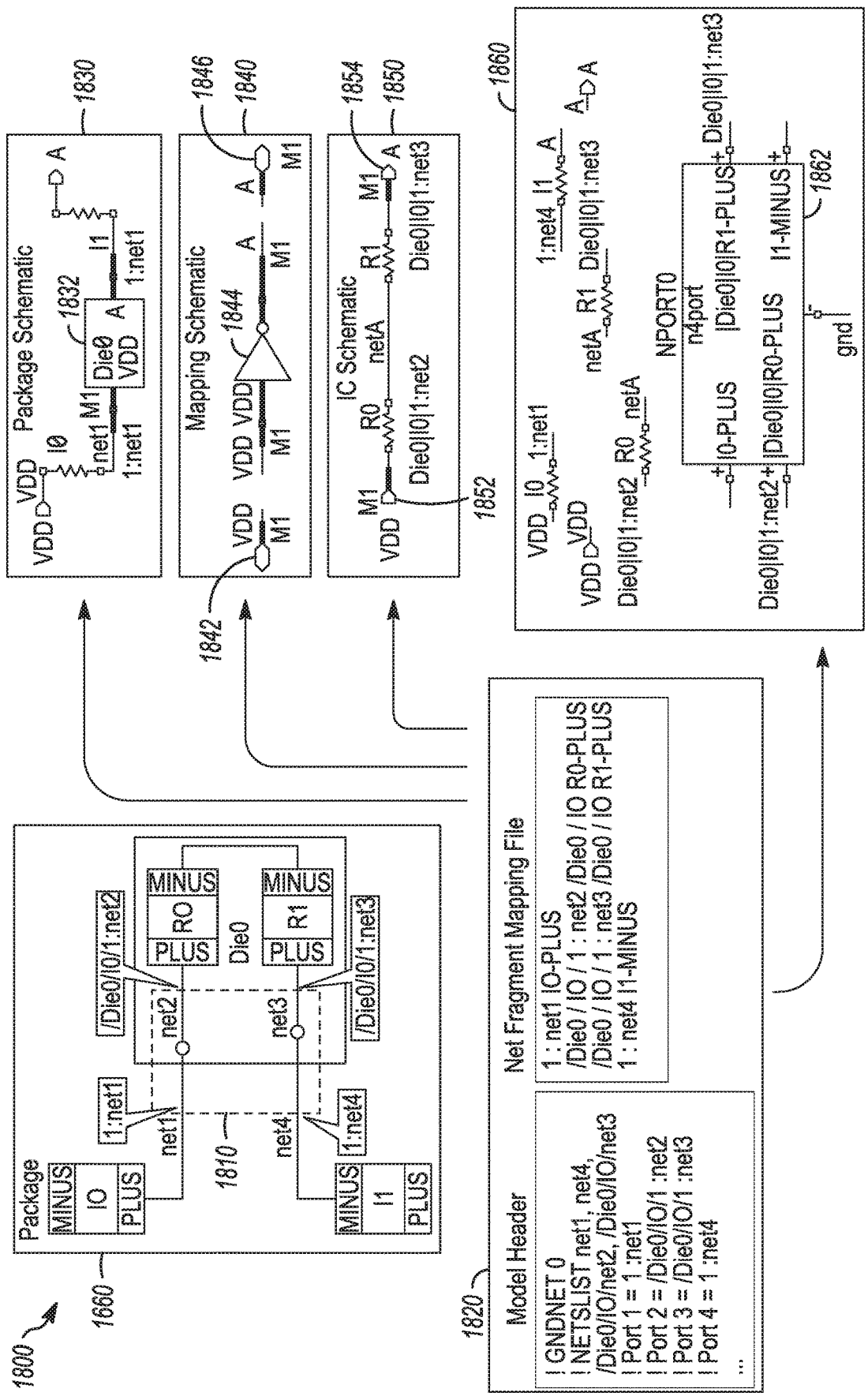

FIGS. 17 and 18 are flow diagrams illustrating operation of some embodiments with respect to schematics and layouts of the example circuit design illustrated by FIG. 16.

FIG. 17 provides a flow diagram 1700 illustrating example operations performed based on with respect to a cut 1710 applied to the cross-fabric package layout 1660 (described above with respect to FIG. 16). The cut 1710 is an example of a single two-point hierarchical cross-fabric cut being applied to a circuit package coupled to an integrated circuit (IC). As shown in FIG. 17, a network net1 of a circuit package layout (depicted in the circuit package layout 1620) is considered to be partitioned (e.g., split) into two portions based on the cut 1710: a portion of the network net1 within the boundary of the cut 1710 and coupled to a network net2; and a portion of the network net1 coupled to terminal I0-PLUS. As also shown in FIG. 17, a network net2 of an IC layout (depicted in the IC layout 1650) is considered to be partitioned (e.g., split) into two portions based on the cut 1710: a portion of the network net2 within the boundary of the cut 1710 and coupled to the network net1; and a portion of the network net2 coupled to terminal R0-PLUS. According to various embodiments, a network fragment is generated for each of these portions.

At operation 1720, a model is generated for the network fragments of the network net1 and the network net2 that result from and fall within the cut 1710, and a network fragment mapping file is generated to map couplings between those network fragments of the network net1 and the network net2. As illustrated, in accordance with some embodiments, the model header for the generated model indicates that the model is a cut-based model (e.g., "ModelType=cutBased") and defines two ports (named "1:net1" and "/Die0/I0/1:net2"), which are generated (e.g., auto generated) at the two cut points where the cut 1710 intersects the network net1 and the cut 1710 intersects the network net2. As shown, the port defined for the cut point of the network net2 comprises the hierarchical name "% Die0/I0/1:net2," which references the die associated with the IC layout (IC fabric) by "/Die0," which references a portion of the network net2 of the IC layout by "1:net2", and which includes an "I0" in the path as a bridge between the IC fabric and the circuit package fabric, thereby including the real hierarchy of the schematic side into the layout side of the circuit design.

According to various embodiments, port 1:net1 is assigned to the network fragment corresponding to the portion of the network net1 that is disposed within the boundary of the cut 1710 (represented by the dashed line), and port/Die0/I0/1:net2 is assigned to the network fragment corresponding to the portion of the network net2 that is disposed within the boundary of the cut 1710. As also illustrated, in accordance with some embodiments, the network fragment mapping file indicates that port 1:net1 is to be coupled to terminal I0-PLUS, and that port/Die0/I0/1:net2 is to be coupled to terminal R0-PLUS.

Based on the model generated at operation 1720, some embodiments generate a schematic extracted view 1760 for the circuit design, which illustrates a graphical representation 1762 of the model generated by operation 1720. Additionally, based on the network fragment mapping file generated at operation 1720 and the schematic extracted view 1760, some embodiments generate a back annotated schematic 1730 of the circuit package schematic by generating and applying annotations 1732 to the circuit package schematic 1610. As shown, the annotations 1732 comprise highlighting of the portion of the network net1 that was extracted by the cut 1710 (to generate a model at operation 1720) and that correspond the generated model, and highlighting of the hierarchical instance to indicate there is a model portion underneath the hierarchy as well. The annotations 1732 further comprise a model name label ("M1"), and a port name label ("1:net1") disposed at locations corresponding to where the port couples with the remainder of the network net1.

Based on the network fragment mapping file generated at operation 1720 and the schematic extracted view 1760, some embodiments generate a back annotated schematic 1740 of the mapping schematic by generating and applying annotations 1742, 1744 to the mapping schematic 1630. As shown, the annotations 1742, 1744 comprise highlighting of the portions of the network net1 and the network net2 that were extracted by the cut 1710 (to generate a model at operation 1720) and that correspond the generated model, and highlighting of the hierarchical instance to indicate there is a model portion underneath the hierarchy as well. The annotations 1742, 1744 further comprise model name labels ("M1").

Additionally, based on the network fragment mapping file generated at operation 1720 and the schematic extracted view 1760, some embodiments generate a back annotated schematic 1750 of the circuit package schematic by generating and applying annotations 1752 to the IC schematic 1640. As shown, the annotations 1752 comprise highlighting of the portion of the network net2 that was extracted by the cut 1710 (to generate a model at operation 1720) and that corresponds to the generated model, and highlighting of the pin side to indicate the other fragment name of the partial net model. The annotations 1752 further comprise a model name label ("M1"), and a port name label ("/Die0/I0/1:net2") disposed at locations corresponding to where the port couples with the remainder of the network net2.

FIG. 18 provides a flow diagram 1800 illustrating example operations performed based on a cut 1810 applied to the cross-fabric package layout 1660 (described above with respect to FIG. 16). The cut 1810 is an example of a single four-point hierarchical cross-fabric cut being applied to multiple networks of a circuit package coupled to an integrated circuit (IC). As shown in FIG. 18, a network net1 of a circuit package layout (depicted in the circuit package layout 1620) is considered to be partitioned (e.g., split) into two portions based on the cut 1810: a portion of the network net1 within the boundary of the cut 1810 and coupled to a network net2; and a portion of the network net1 coupled to terminal I0-PLUS. A network net2 of an IC layout (depicted in the IC layout 1650) is considered to be partitioned (e.g., split) into two portions based on the cut 1810: a portion of the network net2 within the boundary of the cut 1810 and coupled to the network net1; and a portion of the network net2 coupled to terminal R0-PLUS. A network net4 of a circuit package layout (depicted in the circuit package layout 1620) is considered to be partitioned (e.g., split) into two portions based on the cut 1810: a portion of the network net4 within the boundary of the cut 1810 and coupled to a network net3; and a portion of the network net4 coupled to terminal I1-MINUS. As also shown in FIG. 18, a network net3 of an IC layout (depicted in the IC layout 1650) is considered to be partitioned (e.g., split) into two portions based on the cut 1810: a portion of the network net3 within the boundary of the cut 1810 and coupled to the network net4; and a portion of the network net3 coupled to terminal R-PLUS. According to various embodiments, a network fragment is generated for each of these portions.

At operation 1820, a model is generated for the network fragments of the network net1, the network net2, the network net3, and the network net4 that result from and fall within the cut 1810, and a network fragment mapping file is generated to map couplings between those network fragments of the network net1, the network net2, the network net3, and the network net4. As illustrated, in accordance with some embodiments, the model header for the generated model indicates that the model is a cut-based model (e.g., "ModelType=cutBased") and defines four ports (named "1:net1," "/Die0/I0/1:net2," "/Die0/I0/1:net3," and "1:net4"), which are generated (e.g., auto generated) at the four cut points where the cut 1810 intersects the network net1, the network net2, the network net3, the network net4. As shown, the port defined for the cut point of the network net2 comprises the hierarchical name "/Die0/I0/1:net2," which references the die associated with the IC layout (IC fabric) by "/Die0," which references a portion of the network net2 of the IC layout by "1:net2", and which includes an "I0" in the path as a bridge between the IC fabric and the circuit package fabric, thereby including the real hierarchy of the schematic side into the layout side of the circuit design. Likewise, the port defined for the cut point of the network net3 comprises the hierarchical name "/Die0/I0/1:net3," which references the die associated with the IC layout (IC fabric) by "/Die0," which references a portion of the network net3 of the IC layout by "1:net3", and which includes an "I0" in the path as a bridge between the IC fabric and the circuit package fabric.

According to various embodiments, port 1:net1 is assigned to the network fragment corresponding to the portion of the network net1 that is disposed within the boundary of the cut 1810 (represented by the dashed line), port/Die0/I0/1:net2 is assigned to the network fragment corresponding to the portion of the network net2 that is disposed within the boundary of the cut 1810, port/Die0/I0/1:net3 is assigned to the network fragment corresponding to the portion of the network net3 that is disposed within the boundary of the cut 1810, and port 1:net4 is assigned to the network fragment corresponding to the portion of the network net4 that is disposed within the boundary of the cut 1810. As also illustrated, in accordance with some embodiments, the network fragment mapping file indicates that port 1:net1 is to be coupled to terminal I0-PLUS, that port/Die0/I0/1:net2 is to be coupled to terminal R0-PLUS, that port/

Die0/I0/1:net3 is to be coupled to terminal R1-PLUS, and that port 1:net4 is to be coupled to terminal I1-MINUS.

Based on the model generated at operation 1820, some embodiments generate a schematic extracted view 1860 for the circuit design, which illustrates a graphical representation 1862 of the model generated by operation 1820. Additionally, based on the network fragment mapping file generated at operation 1820 and the schematic extracted view 1860, some embodiments generate a back annotated schematic 1830 of the circuit package schematic by generating and applying annotations 1832 to the circuit package schematic 1610. As shown, the annotations 1832 comprise highlighting of the portion of the network net1 that was extracted by the cut 1810 (to generate a model at operation 1820) and that corresponds to the generated model, and highlighting of the hierarchical instance to indicate there is a model portion underneath the hierarchy as well. The annotations 1832 further comprise a model name label ("M1"), and port name labels ("1:net1" and "1:net4") disposed at locations corresponding to where the port couples with the remainder of the network net1 and the network net4.

Based on the network fragment mapping file generated at operation 1820 and the schematic extracted view 1860, some embodiments generate a back annotated schematic 1840 of the mapping schematic by generating and applying annotations 1842, 1844, 1846 to the mapping schematic 1630. As shown, the annotations 1842, 1844, 1846 comprise highlighting of the portions of the network net1, the network net2, the network net3, and the network net4 that were extracted by the cut 1810 (to generate a model at operation 1820) and that correspond to the generated model, and highlighting of the hierarchical instance to indicate there is a model portion underneath the hierarchy as well. The annotations 1842, 1844, 1846 further comprise model name labels ("M1").

Additionally, based on the network fragment mapping file generated at operation 1820 and the schematic extracted view 1860, some embodiments generate a back annotated schematic 1850 of the circuit package schematic by generating and applying annotations 1852, 1854 to the IC schematic 1640. As shown, the annotations 1852, 1854 comprise: highlighting of the portion of the network net2 that was extracted by the cut 1810 (to generate a model at operation 1820) and that corresponds to the generated model; highlighting of the pin sides to indicate the other fragment names of the partial net model; and highlighting of the portion of the network net3 that was extracted by the cut 1810 (to generate a model at operation 1820) and that corresponds to the generated model. The annotations 1852, 1854 further comprise model name labels ("M1") and port name labels ("/Die0/I0/1:net2" and "/Die0/I0/1:net3") disposed at locations corresponding to where the ports couple with the remainder of the network net2 and the network net3.

Figure 19:
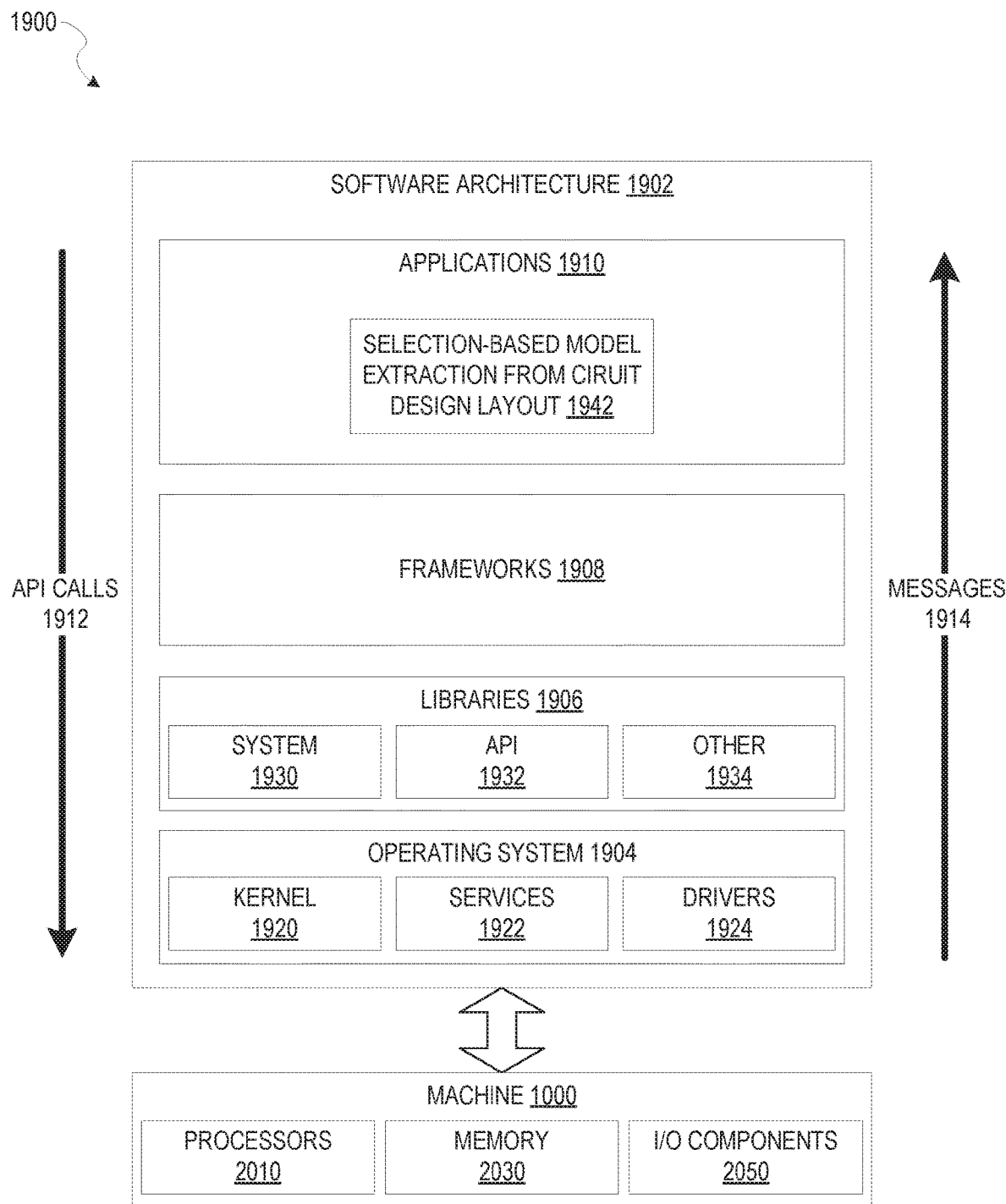
FIG. 19 is a block diagram illustrating an example of a software architecture that may be operating on an electronic design automation (EDA) computing device and may be used with methods for partial selection-based model extraction from a circuit design layout, according to some embodiments.

FIG. 19 is a block diagram 1900 illustrating an example of a software architecture 1902 that may be operating on an EDA computer and may be used with methods for partial selection-based model extraction from a circuit design layout, according to some embodiments. The software architecture 1902 can be used as an EDA computing device to implement any of the methods described above. Aspects of the software architecture 1902 may, in various embodiments, be used to store circuit designs, and to facilitate generation of a circuit design in an EDA environment, from which physical devices may be generated.

FIG. 19 is merely a non-limiting example of a software architecture 1902, and it will be appreciated that many other architectures can be implemented to facilitate the functionality described herein. In various embodiments, the software architecture 1902 is implemented by hardware such as a machine 2000 of FIG. 20 that includes processors 2010, memory 2030, and I/O components 2050. In this example, the software architecture 1902 can be conceptualized as a stack of layers where each layer may provide a particular functionality. For example, the software architecture 1902 includes layers such as an operating system 1904, libraries 1906, software frameworks 1908, and applications 1910. Operationally, the applications 1910 invoke application programming interface (API) calls 1912 through the software stack and receive messages 1914 in response to the API calls 1912, consistent with some embodiments. In various embodiments, any client device, any server computer of a server system, or any other device described herein may operate using elements of the software architecture 1902. An EDA computing device described herein may additionally be implemented using aspects of the software architecture 1902, with the software architecture 1902 adapted for operating to perform partial selection-based model extraction in a manner described herein.

In some embodiments, an EDA application of the applications 1910 performs partial selection-based model extraction from a circuit design layout according to embodiments described herein using various modules within the software architecture 1902. For example, in some embodiments, an EDA computing device similar to the machine 2000 includes the memory 2030 and the one or more processors 2010. The processors 2010 also implement a partial selection-based model extraction of circuit design layout module 1942 for extracting a model from a circuit design layout based on a selection (e.g., cut), in accordance with various embodiments described herein.

In various other embodiments, rather than being implemented as modules of the one or more applications 1910, the circuit design layout module 1942 may be implemented using elements of the libraries 1906, the operating system 1904, or the software frameworks 1908.

In various implementations, the operating system 1904 manages hardware resources and provides common services. The operating system 1904 includes, for example, a kernel 1920, services 1922, and drivers 1924. The kernel 1920 acts as an abstraction layer between the hardware and the other software layers, consistent with some embodiments. For example, the kernel 1920 provides memory management, processor management (e.g., scheduling), component management, networking, and security settings, among other functionality. The services 1922 can provide other common services for the other software layers. The drivers 1924 are responsible for controlling or interfacing with the underlying hardware, according to some embodiments. For instance, the drivers 1924 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1906 provide a low-level common infrastructure utilized by the applications 1910. The libraries 1906 can include system libraries 1930 such as libraries of blocks for use in an EDA environment or other libraries that can provide functions such as memory allocation functions, string manipulation functions, mathematic functions, and the like. In addition, the libraries 1906 can include API libraries 1932 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1906 may also include other libraries 1934.

The software frameworks 1908 provide a high-level common infrastructure that can be utilized by the applications 1910, according to some embodiments. For example, the software frameworks 1908 provide various graphic user interface (GUI) functions, high-level resource management, high-level location services, and so forth. The software frameworks 1908 can provide a broad spectrum of other APIs that can be utilized by the applications 1910, some of which may be specific to a particular operating system 1904 or platform. In various embodiments, the systems, methods, devices, and instructions described herein may use various files, macros, libraries, and other elements of an EDA design environment to implement partial selection-based model extraction from a circuit design layout as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 1902, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 2000 including processors 2010), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 2000, but deployed across a number of machines 2000. In some embodiments, the processors 2010 or processor-implemented modules are located in a single geographic location (e.g., within a home environment, an office environment, or a server farm). In some other embodiments, the processors or processor-implemented modules are distributed across a number of geographic locations.

Figure 20:
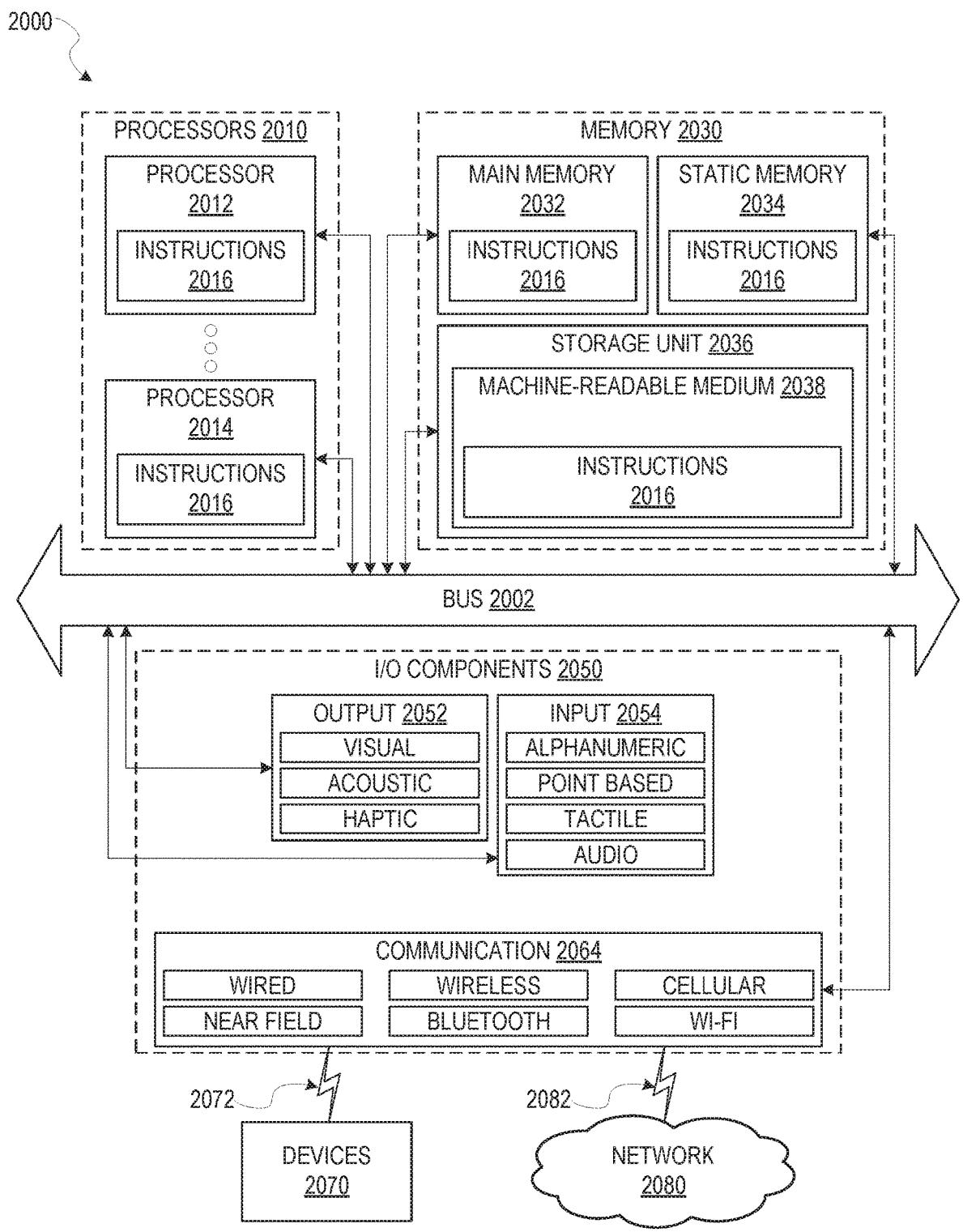
FIG. 20 is a diagram representing a machine in the form of a computer system within which a set of instructions are executed, causing the machine to perform any one or more of the methods discussed herein, according to some embodiments.

FIG. 20 is a diagrammatic representation of the machine 2000 in the form of a computer system within which a set of instructions may be executed for causing the machine 2000 to perform any one or more of the methodologies discussed herein, according to some embodiments. FIG. 20 shows components of the machine 2000, which is, according to some embodiments, able to read instructions from a machine-readable medium (e.g., a machine-readable storage medium) and perform any one or more of the methodologies discussed herein. Specifically, FIG. 20 shows a diagrammatic representation of the machine 2000 in the example form of a computer system, within which instructions 2016 (e.g., software, a program, an application, an applet, an app, or other executable code) for causing the machine 2000 to perform any one or more of the methodologies discussed herein can be executed. In alternative embodiments, the machine 2000 operates as a standalone device or can be coupled (e.g., networked) to other machines. In a networked deployment, the machine 2000 may operate in the capacity of a server machine or a client machine in a server-client network environment, or as a peer machine in a peer-to-peer (or distributed) network environment. The machine 2000 can comprise, but not be limited to, a server computer, a client computer, a personal computer (PC), a tablet computer, a laptop computer, a netbook, or any machine capable of executing the instructions 2016, sequentially or otherwise, that specify actions to be taken by the machine 2000. Further, while only a single machine 2000 is illustrated, the term "machine" shall also be taken to include a collection of machines 2000 that individually or jointly execute the instructions 2016 to perform any one or more of the methodologies discussed herein.

In various embodiments, the machine 2000 comprises processors 2010, memory 2030, and I/O components 2050, which can be configured to communicate with each other via a bus 2002. In some embodiments, the processors 2010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 2012 and a processor 2014 that may execute the instructions 2016. The term "processor" is intended to include multi-core processors 2010 that may comprise two or more independent processors 2012, 2014 (also referred to as "cores") that can execute the instructions 2016 contemporaneously. Although FIG. 20 shows multiple processors 2010, the machine 2000 may include a single processor 2012 with a single core, a single processor 2012 with multiple cores (e.g., a multi-core processor 2012), multiple processors 2010 with a single core, multiple processors 2010 with multiple cores, or any combination thereof.

The memory 2030 comprises a main memory 2032, a static memory 2034, and a storage unit 2036 accessible to the processors 2010 via the bus 2002, according to some embodiments. The storage unit 2036 can include a machine-readable medium 2038 on which are stored the instructions 2016 embodying any one or more of the methodologies or functions described herein. The instructions 2016 can also reside, completely or at least partially, within the main memory 2032, within the static memory 2034, within at least one of the processors 2010 (e.g., within the processor's cache memory), or any suitable combination thereof, during execution thereof by the machine 2000. Accordingly, in various embodiments, the main memory 2032, the static memory 2034, and the processors 2010 are considered machine-readable media 2038.

As used herein, the term "memory" refers to a machine-readable medium 2038 able to store data temporarily or permanently and may be taken to include, but not be limited to, random-access memory (RAM), read-only memory (ROM), buffer memory, flash memory, and cache memory. While the machine-readable medium 2038 is shown, in some embodiments, to be a single medium, the term "machine-readable medium" should be taken to include a single medium or multiple media (e.g., a centralized or distributed database, or associated caches and servers) able to store the instructions 2016. The term "machine-readable medium" shall also be taken to include any medium, or combination of multiple media, that is capable of storing instructions (e.g., the instructions 2016) for execution by a machine (e.g., the machine 2000), such that the instructions, when executed by one or more processors of the machine (e.g., the processors 2010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 2050 include a wide variety of components to receive input, provide output, produce output, transmit information, exchange information, capture measurements, and so on. In general, it will be appreciated that the I/O components 2050 can include many other components that are not shown in FIG. 20. The I/O components 2050 are grouped according to functionality merely for simplifying the following discussion, and the grouping is in no way limiting. In various embodiments, the I/O components 2050 include output components 2052 and input components 2054. The output components 2052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2054 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 2050 may include communication components 2064 operable to couple the machine 2000 to a network 2080 or devices 2070 via a coupling 2082 and a coupling 2072, respectively. For example, the communication components 2064 include a network interface component or another suitable device to interface with the network 2080. In further examples, the communication components 2064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 2070 may be another machine or any of a wide variety of peripheral devices (e.g., a peripheral device coupled via a USB).

In various embodiments, one or more portions of the network 2080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 2080 or a portion of the network 2080 may include a wireless or cellular network, and the coupling 2082 may be a Code Division Multiple Access (CDMA) connection, a Global System for Mobile communications (GSM) connection, or another type of cellular or wireless coupling.

Furthermore, the machine-readable medium 2038 is non-transitory (in other words, not having any transitory signals) in that it does not embody a propagating signal. However, labeling the machine-readable medium 2038 "non-transitory" should not be construed to mean that the machine-readable medium 2038 is incapable of movement; the machine-readable medium 2038 should be considered as being transportable from one physical location to another. Additionally, since the machine-readable medium 2038 is tangible, the machine-readable medium 2038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:

receiving, by a hardware processor, a selection of a portion of a layout of a circuit design, a boundary of the selection partitioning a network of the circuit design into a first set of portions of the network and a second set of portions of the network, the selection of the portion of the layout comprising the first set of portions of the network, the circuit design includes a circuit package that comprises a separate circuit design described by a circuit package schematic, and the first set of portions of the network comprises a circuit design portion inside the circuit package and a circuit design portion outside the circuit package;

generating, by the hardware processor, a first set of network fragments for the first set of portions of the network and a second set of network fragments for the second set of portions of the network based on the boundary of the selection, the first set of network fragments falling within the boundary of the selection, the second set of network fragments falling outside the boundary of the selection;

generating, by the hardware processor, network fragment mapping data describing a mapping for coupling the first set of network fragments with the second set of network fragments, the network fragment mapping data comprises a hierarchical name that maps a circuit design layout component to a circuit design schematic component, the circuit design portion outside of the circuit package comprising the circuit design layout component, and the circuit design portion inside the circuit package comprising the circuit design schematic component;

generating, by the hardware processor, a set of models based on the first set of network fragments; and generating, by the hardware processor, a schematic extracted view of the circuit design based on the set of models and the network fragment mapping data.

2. The method of claim 1, further comprising:

annotating, by the hardware processor, a schematic of the circuit design based on the schematic extracted view and the network fragment mapping data.

3. The method of claim 1, wherein the generating the first set of network fragments for the first set of portions of the network and the second set of network fragments for the second set of portions of the network comprises:

generating a set of named model ports assigned to the first set of network fragments, the set of named model ports for coupling the first set of network fragments to the second set of network fragments.

4. The method of claim 3, wherein the network fragment mapping data describes the mapping based on the set of named model ports.

5. The method of claim 3, wherein the generating the set of models based on the first set of network fragments comprises:

generating model data that describes coupling of the first set of network fragments with the second set of network fragments based on the set of named model ports.

6. The method of claim 1, wherein the generating the schematic extracted view of the circuit design based on the set of models and the network fragment mapping data comprises:

replacing a portion of a schematic of the circuit design with instances of the set of models based on the network fragment mapping data.

7. The method of claim 1, wherein the selection comprises a cut of the layout.

8. The method of claim 1, wherein the receiving the selection of the portion of the layout of the circuit design comprises:

receiving a user input that corresponds to the selection.

9. The method of claim 8, wherein the user input is received by way of a graphical user interface that displaying a graphical representation of at least the portion of the layout of the circuit design.

10. The method of claim 1, wherein the set of models includes an s-parameter model.

11. The method of claim 1, wherein the hierarchical name comprises an embedded name that operates as a bridge between circuit design layout component and the circuit design schematic component.

12. A device comprising:

a memory storing instructions; and a hardware processor communicatively coupled to the memory and configured by the instructions to perform operations comprising:

causing, on an electronic display, presentation of a graphical representation of a layout of a circuit design;

receiving, with respect to the graphical representation, a user input corresponding to a selection of a portion of the layout, a boundary of the selection partitioning a network of the circuit design into a first set of portions of the network and a second set of portions of the network, the selection of the portion of the layout comprising the first set of portions of the network;

generating a first set of network fragments for the first set of portions of the network and a second set of network fragments for the second set of portions of the network based on the boundary of the selection, the first set of network fragments falling within the boundary of the selection, the second set of network fragments falling outside the boundary of the selection, and the generating the first set of network fragments and the second set of network fragments comprising generating a set of named model ports assigned to the first set of network fragments;

generating network fragment mapping data describing a mapping for coupling the first set of network fragments with the second set of network fragments the network fragment mapping data describing the mapping in terms of the set of named model ports;

generating a set of models based on the first set of network fragments; and generating a schematic extracted view of the circuit design based on the set of models and the network fragment mapping data.

13. The device of claim 12, wherein the operations further comprise:

annotating a schematic of the circuit design based on the schematic extracted view and the network fragment mapping data.

14. The device of claim 12, wherein the generating the set of models based on the first set of network fragments comprises:

generating model data that describes coupling of the first set of network fragments with the second set of network fragments based on the set of named model ports.

15. The device of claim 12, wherein the generating the schematic extracted view of the circuit design based on the set of models and the network fragment mapping data comprises:

replacing a portion of a schematic of the circuit design with instances of the set of models based on the network fragment mapping data.

16. The device of claim 12, wherein the circuit design includes a circuit package that comprises a separate circuit design described by a circuit package schematic, the first set of portions of the network comprises a circuit design portion inside the circuit package and a circuit design portion outside the circuit package, the network fragment mapping data comprises a hierarchical name that maps a circuit design layout component to a circuit design schematic component, the circuit design portion outside of the circuit package comprising the circuit design layout component, and the circuit design portion inside the circuit package comprising the circuit design schematic component.

17. A non-transitory computer-readable medium comprising instructions that, when executed by a hardware processor of a device, cause the device to perform operations comprising:

generating, based on a boundary of a selection of a layout of a circuit design, a first set of network fragments of the circuit design and a second set of network fragments of the circuit design, the first set of network fragments falling within the boundary of the selection, the second set of network fragments falling outside the boundary of the selection, and the generating the first set of network fragments and the second set of network fragments comprising generating a set of named model ports assigned to the first set of network fragments;

generating network fragment mapping data describing a mapping for coupling the first set of network fragments with the second set of network fragments, the network fragment mapping data describing the mapping in terms of the set of named model ports;

generating a set of models based on the first set of network fragments; and generating a schematic extracted view of the circuit design based on the set of models and the network fragment mapping data.

18. The non-transitory computer-readable medium of claim 17, wherein the operations further comprise:

annotating a schematic of the circuit design based on the schematic extracted view and the network fragment mapping data.

19. The non-transitory computer-readable medium of claim 17, wherein the generating the set of models based on the first set of network fragments comprises:

generating model data that describes coupling of the first set of network fragments with the second set of network fragments based on the set of named model ports.

20. The non-transitory computer-readable medium of claim 17, wherein the circuit design includes a circuit package that comprises a separate circuit design described by a circuit package schematic, the selection of the layout comprising a circuit design portion inside the circuit package and a circuit design portion outside the circuit package, the network fragment mapping data comprises a hierarchical name that maps a circuit design layout component to a circuit design schematic component, the circuit design portion outside of the circuit package comprising the circuit design layout component, and the circuit design portion inside the circuit package comprising the circuit design schematic component.

* * * * *